United States Patent
Wang

(10) Patent No.: US 12,538,206 B2
(45) Date of Patent: Jan. 27, 2026

(54) ROUTING METHOD, APPARATUS, AND SYSTEM

(71) Applicant: HUAWEI TECHNOLOGIES CO., LTD., Guangdong (CN)

(72) Inventor: Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 18/331,225

(22) Filed: Jun. 8, 2023

(65) Prior Publication Data

US 2023/0319682 A1  Oct. 5, 2023

Related U.S. Application Data

(63) Continuation of application No. PCT/CN2020/135003, filed on Dec. 9, 2020.

(51) Int. Cl.
  *H04W 40/22* (2009.01)
  *H04W 40/24* (2009.01)
  *H04W 88/04* (2009.01)

(52) U.S. Cl.
  CPC ......... *H04W 40/22* (2013.01); *H04W 40/248* (2013.01); *H04W 88/04* (2013.01)

(58) Field of Classification Search
  CPC ... H04W 40/22; H04W 40/248; H04W 88/04; H04W 92/18
  See application file for complete search history.

(56) References Cited

U.S. PATENT DOCUMENTS

| | | | | |
|---|---|---|---|---|
| 8,971,233 B2 * | 3/2015 | Moberg | ............... | H04W 76/11 |
| | | | | 455/449 |
| 9,986,431 B2 * | 5/2018 | Lehtovirta | ............ | H04W 76/14 |
| 10,090,908 B1 * | 10/2018 | Velusamy | ............. | H04W 76/27 |
| 10,098,039 B1 * | 10/2018 | Manchanda | ........... | H04W 28/14 |
| 11,563,659 B2 * | 1/2023 | Won | ................... | H04L 43/0817 |

(Continued)

FOREIGN PATENT DOCUMENTS

| | | |
|---|---|---|
| CN | 111901784 A | 11/2020 |
| WO | 2018059126 A1 | 4/2018 |

OTHER PUBLICATIONS

3GPP TR 23.752 V1.0.0(Nov. 2020), 3rd Generation Partnership Project; Technical Specification Group Services and System Aspects; Study on system enhancement for Proximity based Services (ProSe) in the 5G System (5GS) (Release 17) Nov. 30, 2020,XP51961728A, total 181 pages.

(Continued)

*Primary Examiner* — Dung B Huynh

(57) ABSTRACT

This application discloses a routing method, an apparatus, and a system. In the method, first user equipment (UE) determines that a target node and a next-hop node of a first data packet are respectively a network device and first relay UE, and sends the first data packet, an identifier of the first UE, an identifier of the first relay UE, and an identifier of the network device to the first relay UE. According to the method, UE (for example, remote UE or relay UE) may autonomously determine a next-hop node of a data packet, and send the data packet to the next-hop node. The data packet is sent to a target node by implementing routing between two nodes. In this way, routing between a network device and remote UE is implemented.

17 Claims, 9 Drawing Sheets

(56) References Cited

U.S. PATENT DOCUMENTS

| | | | |
|---|---|---|---|
| 2008/0285501 A1* | 11/2008 | Zhang | H04L 69/22 370/315 |
| 2010/0014451 A1* | 1/2010 | Fujino | H04L 67/14 370/315 |
| 2010/0195656 A1* | 8/2010 | Matsushita | H04W 74/0825 370/392 |
| 2010/0290393 A1* | 11/2010 | Matsushita | H04L 45/025 370/328 |
| 2012/0166582 A1* | 6/2012 | Binder | H04L 63/0281 709/217 |
| 2012/0317234 A1* | 12/2012 | Bohrer | H04W 4/00 709/219 |
| 2015/0195225 A1* | 7/2015 | Albert | H04L 51/216 709/206 |
| 2016/0100346 A1* | 4/2016 | Hall | H04L 45/74 370/315 |
| 2016/0156742 A1* | 6/2016 | Seo | H04L 12/4633 709/203 |
| 2016/0157182 A1* | 6/2016 | Izawa | H04W 52/383 455/522 |
| 2016/0212780 A1* | 7/2016 | Stojanovski | H04W 8/005 |
| 2016/0295565 A1* | 10/2016 | Kim | H04L 5/0053 |
| 2017/0111754 A1* | 4/2017 | Baghel | H04W 76/27 |
| 2017/0171874 A1* | 6/2017 | Kim | H04B 7/2606 |
| 2017/0359116 A1* | 12/2017 | Hwang | H04W 40/22 |
| 2018/0027210 A1* | 1/2018 | Du | H04L 51/48 348/14.01 |
| 2018/0077608 A1* | 3/2018 | Jung | H04W 76/14 |
| 2018/0084478 A1* | 3/2018 | Lee | H04W 28/12 |
| 2018/0213577 A1* | 7/2018 | Burbidge | H04W 76/10 |
| 2018/0287689 A1* | 10/2018 | Lee | H04W 48/16 |
| 2019/0021135 A1* | 1/2019 | Jin | H04W 56/0005 |
| 2019/0029061 A1* | 1/2019 | Feng | H04W 80/08 |
| 2019/0110238 A1* | 4/2019 | Buckley | H04W 8/06 |
| 2019/0166486 A1* | 5/2019 | Tang | H04W 8/24 |
| 2019/0223239 A1* | 7/2019 | Adachi | H04W 92/18 |
| 2019/0239132 A1* | 8/2019 | Wallentin | H04W 88/04 |
| 2019/0239284 A1* | 8/2019 | Xu | H04W 76/11 |
| 2019/0261450 A1* | 8/2019 | Adachi | H04W 76/11 |
| 2019/0357123 A1* | 11/2019 | Jha | H04L 1/00 |
| 2019/0357280 A1* | 11/2019 | Lee | H04W 8/26 |
| 2019/0373493 A1* | 12/2019 | Uchiyama | H04L 49/90 |
| 2020/0022194 A1* | 1/2020 | Wang | H04W 76/12 |
| 2020/0029353 A1* | 1/2020 | Xu | H04W 72/21 |
| 2020/0288535 A1* | 9/2020 | Sharma | H04W 36/0033 |
| 2021/0013960 A1* | 1/2021 | Raghavan | H04W 88/04 |
| 2021/0084506 A1* | 3/2021 | Kimba Dit Adamou | H04L 45/28 |
| 2021/0160956 A1* | 5/2021 | Wang | H04W 40/34 |
| 2021/0160957 A1* | 5/2021 | Wang | H04W 40/22 |
| 2021/0176658 A1* | 6/2021 | Wang | H04L 41/0803 |
| 2021/0307094 A1* | 9/2021 | Agiwal | H04W 76/10 |
| 2021/0352767 A1* | 11/2021 | Paladugu | H04W 76/11 |
| 2021/0368417 A1* | 11/2021 | Luo | H04W 40/22 |
| 2021/0377842 A1* | 12/2021 | Xu | H04W 40/12 |
| 2022/0038965 A1* | 2/2022 | Wang | H04W 36/305 |
| 2022/0109970 A1* | 4/2022 | Jeong | H04W 72/02 |
| 2022/0159753 A1* | 5/2022 | Kuo | H04W 76/14 |
| 2022/0224409 A1* | 7/2022 | Perras | H04B 7/2606 |
| 2022/0225448 A1* | 7/2022 | Li | H04W 8/005 |
| 2022/0248298 A1* | 8/2022 | Liu | H04L 45/20 |
| 2022/0248484 A1* | 8/2022 | Wang | H04W 76/15 |
| 2022/0279610 A1* | 9/2022 | Fan | H04W 76/11 |
| 2022/0303862 A1* | 9/2022 | Wu | H04L 45/66 |
| 2022/0312177 A1* | 9/2022 | Yu | H04W 48/16 |
| 2022/0312262 A1* | 9/2022 | Chen | H04W 28/06 |
| 2022/0338092 A1* | 10/2022 | Wang | H04W 72/02 |
| 2022/0408342 A1* | 12/2022 | Lu | H04B 7/15 |
| 2022/0408344 A1* | 12/2022 | Lu | H04W 76/14 |
| 2022/0418015 A1* | 12/2022 | Paladugu | H04W 76/15 |
| 2023/0079604 A1* | 3/2023 | Fan | H04W 40/20 370/315 |
| 2023/0145738 A1* | 5/2023 | Yang | H04W 72/40 370/315 |
| 2023/0180178 A1* | 6/2023 | Yang | H04W 76/14 455/458 |
| 2023/0189050 A1* | 6/2023 | Rao | H04L 47/283 370/231 |
| 2023/0189101 A1* | 6/2023 | Bi | H04W 36/08 370/331 |
| 2023/0232487 A1* | 7/2023 | Freda | H04W 76/23 455/11.1 |
| 2023/0247518 A1* | 8/2023 | Zhang | H04W 40/20 370/328 |
| 2023/0262577 A1* | 8/2023 | Peng | H04W 40/22 370/315 |
| 2023/0292382 A1* | 9/2023 | Loehr | H04L 1/1896 |
| 2023/0379989 A1* | 11/2023 | Hahn | H04W 40/12 |
| 2023/0379990 A1* | 11/2023 | Hahn | H04W 76/30 |
| 2023/0397100 A1* | 12/2023 | Chen | H04W 72/25 |
| 2024/0064602 A1* | 2/2024 | Wu | H04L 45/66 |
| 2024/0259906 A1* | 8/2024 | Freda | H04W 40/22 |

OTHER PUBLICATIONS

PCT International Search Report for Application PCT/CN2020/135003 dated Dec. 9, 2020, 56 pages.

Extended European Search Report for Application No. 20964595 dated Dec. 5, 2023, 12 pages.

* cited by examiner

ROUTING METHOD, APPARATUS, AND SYSTEM

CROSS-REFERENCE TO RELATED APPLICATIONS

This application is a continuation of International Application No. PCT/CN2020/135003, filed on Dec. 9, 2020, the disclosure of which is hereby incorporated by reference in its entirety.

TECHNICAL FIELD

This application relates to the field of wireless communication technologies, and in particular, to a routing method, an apparatus, and a system.

BACKGROUND

A user equipment-to-network relay (U2N) technology can effectively improve network coverage. Network elements in a U2N scenario include a network device, a relay terminal device (relay user equipment, relay UE), and a remote terminal device (remote UE). The relay UE may provide a relay service for the remote UE, and the network device may provide a network service for the remote UE via the relay UE.

One relay UE may provide a relay service for a plurality of remote UEs. To clearly distinguish between all remote UEs, the relay UE may allocate a local identifier (local ID) to each remote UE that establishes a sidelink (SL) connection to the relay UE, or the network device may allocate a local identifier to each remote UE connected to the relay UE. The local identifier can uniquely identify one remote UE within a range of the relay UE, so that the relay UE and the network device clearly distinguish between all the remote UEs. In this way, the local identifier may be used in a U2N system to implement routing between the remote UE and the network device. Uplink transmission is used as an example. The relay UE receives a data packet from the remote UE, and a target node of the data packet is the network device. The relay UE adds a local identifier of the remote UE to the data packet, and sends a data packet to which the local identifier is added to the network device. After receiving the data packet to which the local identifier is added, the network device may determine, based on the local identifier in the data packet to which the local identifier is added, that a source node of the data packet is the remote UE.

When there are a plurality of relay UEs between the remote UE and the network device, each of the plurality of relay UEs may configure a local identifier for UE (remote UE or relay UE) within a range of the relay UE. A same local identifier may identify different UEs with respect to different relay UEs. Therefore, neither of the network device and the relay UE can distinguish between all remote UEs based on the local identifier. As a result, the network device and the remote UE cannot normally communicate with each other.

SUMMARY

Embodiments of this application provide a routing method, an apparatus, and a system, to implement routing between remote UE and a network device.

According to a first aspect, an embodiment of this application provides a routing method. The method may be performed by a first terminal device, or may be performed by a component (such as a processor, a chip, or a chip system) of the first terminal device. In the method, the first terminal device may determine that a target node of a first data packet is a network device; determine that a next-hop node of the first data packet is a first relay terminal device, where there is an SL connection between the first terminal device and the first relay terminal device; and send the first data packet, an identifier of the first terminal device, an identifier of the network device, and an identifier of the first relay terminal device to the first relay terminal device.

According to the method, the first UE may determine that the first relay UE that establishes an SL connection to the first UE is the next-hop node of the first data packet. In other words, the first UE may determine the next-hop node of the first data packet based on an SL connection establishment status of the first UE. For example, the first UE may select, as the next-hop node of the first data packet, one relay UE from one or more relay UEs that establish an SL connection. In this way, the first UE may transmit the first data packet to the first relay UE, and then the first relay UE forwards the first data packet to the network device, so that routing between the first UE and the network device can be implemented by implementing routing between the first UE and the first relay terminal device.

In a possible design, the sending the first data packet, an identifier of the first terminal device, an identifier of the network device, and an identifier of the first relay terminal device to the first relay terminal device includes: sending a second data packet to the first relay terminal device, where the second data packet is obtained by encapsulating the first data packet with a first protocol header, and the first protocol header includes the identifier of the first terminal device, the identifier of the network device, and the identifier of the first relay terminal device. According to this design, the first UE may use the first protocol header to carry the identifier of the first UE, the identifier of the network device, and the identifier of the first relay UE, and send the first protocol header to the first relay UE. In this way, the first relay UE may obtain routing information related to the first data packet by parsing the first protocol header. The first protocol header may belong to a first protocol layer (for example, a BAP layer).

In a possible design, the determining that a next-hop node of the first data packet is a first relay terminal device includes: determining, based on first information associated with the first data packet, that the next-hop node of the first data packet is the first relay terminal device, where the first information includes at least one of the following information: a data type, a message type, port information, or quality of service (QOS) information. According to this design, the first UE may flexibly determine the next-hop node based on at least one of the data type, the message type, the port information, the QoS information, or the like. For example, when there is an SL connection between the first UE and each of a plurality of relay UEs, the first UE may select the next-hop node suitable for the first data packet from the plurality of relay UEs based on the first information. For example, the first UE may determine the next-hop node based on the QoS information of the first data packet, to satisfy quality of service of the first data packet.

In a possible design, the method may further include: determining a first logical channel based on second information associated with the first data packet, where the second information includes at least one of the following information: the data type, the message type, the port information, the QoS information, or an identifier of a first data radio bearer (DRB); and the sending the first data packet, an identifier of the first terminal device, an identifier of the network device, and an identifier of the first relay terminal device to the first relay terminal device includes: sending the first data packet, the identifier of the first terminal device, the identifier of the network device, and the identifier of the first relay terminal device to the first relay terminal device through the first logical channel. When the data type of the first data packet is data, the first DRB may be used to carry the first data packet. According to this design, the first UE may flexibly determine, based on at least one of the data type, the message type, the port information, the QoS information, the identifier of the first DRB, or the like, the first logical channel for carrying the first data packet. For example, when there are a plurality of logical channels between the first UE and the first relay UE, the first UE may determine a logical channel suitable for the first data packet from the plurality of logical channels based on the second information, to ensure that the first UE can transmit the first data packet to the first relay UE.

In a possible design, the first protocol header may further include an identifier of a previous-hop node of the first terminal device, or the first data packet may include an identifier of a previous-hop node of the first terminal device. The identifier of the previous-hop node of the first terminal device is for determining first downlink routing table information, and the first downlink routing table information indicates a downlink route of the first terminal device. According to this design, if the first UE is connected to a child node, the first UE may use a BAP header or the first data packet to carry an identifier of the child node of the first UE. In this way, the network device may configure downlink routing table information for the first UE based on the identifier of the child node of the first UE, to implement a downlink route between the first UE and the child node of the first UE.

In addition/alternatively, the first UE may use a BAP header or the first data packet to carry an identifier of a parent node of the first UE. In this way, the network device may configure downlink routing table information for the parent node of the first UE based on the identifier of the parent node of the first UE, to implement a downlink route between the first UE and the parent node of the first UE.

In a possible design, the method may further include: receiving a first message, where the first message includes the identifier of the network device. According to this design, after receiving the first message, the first UE may determine the target node of the first data packet based on the first message. Alternatively, the first UE may determine a predefined network device as the target node of the first data packet.

In a possible design, the method may further include: generating the first data packet. According to this design, the first UE may be terminal UE. When the first UE is terminal UE, the first UE may generate the first data packet, and send the first data packet to the network device. In other words, the first UE is a source node of the first data packet.

According to a second aspect, an embodiment of this application provides a routing method. The method may be performed by a first relay terminal device, or may be performed by a component (such as a processor, a chip, or a chip system) of the first relay terminal device. In the method, the first relay UE may receive a first data packet, an identifier of a first terminal device, an identifier of a network device, and an identifier of the first relay terminal device from the first terminal device, where the first terminal device is a source node of the first data packet, and the network device is a target node of the first data packet; determine that a next-hop node of the first data packet is a second relay terminal device, where there is a sidelink (SL) connection between the first relay terminal device and the second relay terminal device; and send the first data packet, the identifier of the first terminal device, the identifier of the network device, the identifier of the first relay terminal device, and an identifier of the second relay terminal device to the second relay terminal device.

According to the method, the first relay UE may determine that the second relay UE that establishes an SL connection to the first relay UE is the next-hop node of the first data packet. In other words, the first relay UE may determine the next-hop node of the first data packet based on an SL connection establishment status of the first relay UE. For example, the first relay UE selects, as the next-hop node of the first data packet, one relay UE from one or more relay UEs that establish an SL connection. In this way, the first relay UE may forward the first data packet from the first UE to the second relay UE, and the second relay UE forwards the first data packet to the network device, so that routing between the first UE and the network device can be implemented by implementing routing between the first relay UE and the second relay UE.

In a possible design, the receiving a first data packet, an identifier of a first terminal device, an identifier of a network device, and an identifier of the first relay terminal device from the first terminal device includes: receiving a second data packet from the first terminal device; and decapsulating the second data packet to obtain the first data packet and a first protocol header, where the first protocol header includes the identifier of the first terminal device, the identifier of the network device, and the identifier of the first relay terminal device. According to this design, the first UE may use the first protocol header to carry the identifier of the first UE, the identifier of the network device, and the identifier of the first relay UE, and send the first protocol header to the first relay UE. In this way, after receiving the second data packet, the first relay UE may obtain the first data packet and the first protocol header by decapsulating the second data packet. The first protocol header includes routing information about the first data packet. The first protocol header may belong to a first protocol layer (for example, a BAP layer).

In a possible design, the sending the first data packet, the identifier of the first terminal device, the identifier of the network device, the identifier of the first relay terminal device, and an identifier of the second relay terminal device to the second relay terminal device includes: sending a third data packet to the second relay terminal device. In a possible manner, the third data packet may be obtained by encapsulating the first data packet with a second protocol header. The second protocol header includes the identifier of the first terminal device, the identifier of the network device, the identifier of the first relay terminal device, and the identifier of the second relay terminal device. According to this design, the first relay UE may use the second protocol header to carry the identifier of the first UE, the identifier of the network device, the identifier of the first relay UE, and the identifier of the second relay UE, and send the second protocol header to the second relay UE. In this way, the second relay may obtain routing information about the first data packet by parsing the second protocol header. The second protocol header may belong to a first protocol layer (for example, a BAP layer).

In another possible manner, the third data packet may be obtained by modifying, based on the second data packet, content carried in the first protocol header, or may be another data packet that carries the identifier of the first UE, the identifier of the network device, the identifier of the first relay UE, and the identifier of the second relay UE.

In a possible design, the determining that a next-hop node of the first data packet is a second relay terminal device includes: determining, based on third information associated with the first data packet, that the next-hop node of the first data packet is the second relay terminal device, where the third information includes at least one of the following information: an identifier of the source node, an identifier of the target node, an identifier of a previous-hop node, an identifier of the next-hop node, a data type, a message type, an identifier of a first data radio bearer (DRB), or quality of service (QOS) information. According to this design, the first relay UE may flexibly determine the next-hop node based on at least one of the identifier of the source node, the identifier of the target node, the identifier of the previous-hop node, the data type, the message type, the identifier of the first data radio bearer (DRB), the quality of service (QOS) information, or the like. The data type may include message (such as RRC signaling or NAS signaling), data, and the like. The message type may include RRC connection setup request message, RRC connection reestablishment request message, RRC reconfiguration complete message, and the like. For example, the first relay UE may select the next-hop node suitable for the first data packet based on the data type. For example, the first data packet includes first data, that is, the data type of the first data packet is data, and the first relay UE may select a next-hop node corresponding to the first data as the next-hop node of the first data packet.

In a possible design, the method may further include: determining a second logical channel based on fourth information associated with the first data packet, where the fourth information includes at least one of the following information: the identifier of the source node, the identifier of the target node, the identifier of the previous-hop node, the identifier of the next-hop node, the identifier of the first DRB, or the QoS information; and the sending the first data packet, the identifier of the first terminal device, an identifier of the second relay terminal device, and the identifier of the network device to the second relay terminal device includes: sending the first data packet, the identifier of the first terminal device, the identifier of the second terminal relay device, and the identifier of the network device to the second relay terminal device through the second logical channel. According to this design, the first relay UE may flexibly determine, based on at least one of the identifier of the source node, the identifier of the target node, the identifier of the previous-hop node, the identifier of the next-hop node, the identifier of the first DRB, the QoS information, or the like, the second logical channel for carrying the first data packet. For example, when there are a plurality of logical channels between the first relay UE and the second relay UE, the first relay UE may determine a logical channel suitable for the first data packet from the plurality of logical channels based on the fourth information, to ensure that the first data packet can be transmitted to the second relay UE.

In a possible design, the second protocol header further includes an identifier of a previous-hop node of the first terminal device, or the first data packet includes an identifier of a previous-hop node of the first terminal device. The identifier of the previous-hop node of the first terminal device is for determining first downlink routing table information, and the first downlink routing table information indicates a downlink route of the first terminal device. According to this design, the network device may configure downlink routing table information for the first UE, to implement a downlink route between the first UE and a child node of the first UE.

According to a third aspect, an embodiment of this application provides a routing method. The method may be performed by a second relay terminal device, or may be performed by a component (such as a processor, a chip, or a chip system) of the second relay terminal device. In the method, the second relay UE may receive a first data packet, an identifier of a first terminal device, an identifier of a network device, an identifier of a first relay terminal device, and an identifier of the second relay terminal device from the first relay terminal device, where the first terminal device is a source node of the first data packet, and the network device is a target node of the first data packet; determine that a next-hop node of the first data packet is the network device, where there is a radio resource control (RRC) connection between the second relay terminal device and the network device; and send the first data packet and the identifier of the first terminal device to the network device.

According to the method, because the second relay UE is directly connected to the network device, and the target node of the first data packet is the network device, the second relay UE may determine that the network device is the next-hop node of the first data packet. In addition, the second relay UE may send the first data packet, the identifier of the first UE, the identifier of the network device, and the identifier of the second relay UE to the network device. Alternatively, the second relay UE may send the first data packet and the identifier of the first UE to the network device, so that the network device can determine the source node of the first data packet, and overheads can be reduced.

In a possible design, the receiving a first data packet, an identifier of a first terminal device, an identifier of a network device, an identifier of a first relay terminal device, and an identifier of the second relay terminal device from the first relay terminal device includes: receiving a third data packet from the first relay terminal device; and decapsulating the third data packet to obtain the first data packet and a second protocol header, where the second protocol header includes the identifier of the first terminal device, the identifier of the network device, the identifier of the first relay terminal device, and the identifier of the second relay terminal device. According to this design, the second relay UE may determine routing information of the first data packet, for example, the target node or the source node, by parsing the second protocol header.

In a possible design, the sending the first data packet and the identifier of the first terminal device to the network device includes: sending a fourth data packet to the network device. In a possible manner, the fourth data packet may be obtained by encapsulating the first data packet with a third protocol header, and the third protocol header includes the identifier of the first terminal device. According to this design, the second relay UE may use the third protocol header (for example, a third BAP header) to carry the identifier of the first UE, and send the third protocol header to the network device. In this way, the network device determines the source node of the first data packet by parsing the third protocol header.

In another possible manner, the fourth data packet may be obtained by modifying, based on the third data packet or the second data packet, content carried in a protocol header, or may be another data packet that carries the identifier of the first UE.

In a possible design, the method may further include: determining a third logical channel based on fourth information associated with the first data packet, where the fourth information includes at least one of the following information: an identifier of the source node, an identifier of the target node, an identifier of a previous-hop node, an identifier of the next-hop node, an identifier of a first data radio bearer (DRB), or quality of service (QOS) information; and the sending the first data packet and the identifier of the first terminal device to the network device includes: sending the first data packet and the identifier of the first terminal device to the network device through the third logical channel. According to this design, the second relay UE may flexibly determine the third logical channel based on the fourth information, to select a logical channel suitable for the first data packet, to implement routing between the second relay UE and the network device.

In a possible design, the third protocol header further includes an identifier of a previous hop of the first terminal device, the identifier of the previous-hop node of the first terminal device is for determining first downlink routing table information, and the first downlink routing table information indicates a downlink route of the first terminal device. According to this design, the network device may configure downlink routing table information for the first UE, to implement a downlink route between the first UE and a child node of the first UE.

In a possible design, the first data packet includes an identifier of a previous-hop node of the first terminal device, the identifier of the previous-hop node of the first terminal device is for determining first downlink routing table information, and the first downlink routing table information indicates a downlink route of the first terminal device. According to this design, the network device may configure downlink routing table information for the first UE, to implement a downlink route between the first UE and a child node of the first UE.

According to a fourth aspect, an embodiment of this application provides a routing method. The method may be performed by a network device, or may be performed by a component (such as a processor, a chip, or a chip system) of the network device, and includes: The network device may receive a first data packet and an identifier of a first terminal device from a second relay terminal device; determine, based on fifth information associated with a fifth data packet, that a next-hop node of the fifth data packet is the second relay terminal device, where a target node of the fifth data packet is the first terminal device, and there is a radio resource control RRC connection between the network device and the second relay device; and send the fifth data packet, the identifier of the first terminal device, an identifier of the network device, and an identifier of the second relay terminal device to the second relay terminal device.

In a possible design, the fifth information includes at least one of the following information: a data type, a message type, port information, or quality of service (QOS) information.

In a possible design, the receiving a first data packet and an identifier of a first terminal device from a second relay terminal device includes: receiving a fourth data packet from the second relay terminal device; and decapsulating the fourth data packet to obtain the first data packet and a third protocol header, where the third protocol header includes the identifier of the first terminal device.

In a possible design, the sending the fifth data packet, the identifier of the first terminal device, an identifier of the network device, and an identifier of the second relay terminal device to the second relay terminal device includes: sending a sixth data packet to the second relay terminal device, where the sixth data packet is obtained by encapsulating the fifth data packet with a fourth protocol header, and the fourth protocol header includes the identifier of the first terminal device, the identifier of the network device, and the identifier of the second relay terminal device.

In a possible design, the method may further include: determining a fourth logical channel based on sixth information associated with the fifth data packet, where the sixth information includes at least one of the following information: the data type, the message type, the port information, the QoS information, or an identifier of a second data radio bearer (DRB); and the sending the fifth data packet, the identifier of the first terminal device, an identifier of the network device, and an identifier of the second relay terminal device to the second relay terminal device includes: sending the fifth data packet, the identifier of the first terminal device, the identifier of the network device, and the identifier of the second relay terminal device to the second relay terminal device through the fourth logical channel. When the data type of the fifth data packet is data, the second DRB may be used to carry the fifth data packet.

In a possible design, the third protocol header further includes an identifier of a previous-hop node of the first terminal device, or the first data packet includes a previous-hop node of the first terminal device, and the method may further include: determining first downlink routing table information based on the identifier of the previous-hop node of the first terminal device, where the first downlink routing table information indicates a downlink route of the first terminal device; and sending the first downlink routing table information to the first terminal device.

In a possible design, the method may further include: sending a first message, where the first message includes the identifier of the network device.

According to a fifth aspect, an embodiment of this application provides a routing method. The method may be performed by a third relay terminal device, or may be performed by a component (such as a processor, a chip, or a chip system) of the third relay terminal device. The method includes: receiving a first data packet, an identifier of a first terminal device, an identifier of a network device, an identifier of a first relay terminal device, and an identifier of the third relay terminal device from the first relay terminal device, where the first terminal device is a source node of the first data packet, and the network device is a target node of the first data packet; determining that a next-hop node of the first data packet is a second relay terminal device, where there is a sidelink (SL) connection between the second relay terminal device and the third relay terminal device; and sending the first data packet, the identifier of the first terminal device, the identifier of the network device, an identifier of the second relay terminal device, and the identifier of the third relay terminal device to the second relay terminal device.

In a possible design, the receiving a first data packet, an identifier of a first terminal device, an identifier of a network device, an identifier of a first relay terminal device, and an identifier of the third relay terminal device from the first relay terminal device includes: receiving a seventh data packet from the first relay terminal device; and decapsulating the seventh data packet to obtain the first data packet and a fifth protocol header, where the fifth protocol header includes the identifier of the first terminal device, the identifier of the network device, the identifier of the first relay terminal device, and the identifier of the third relay terminal device.

In a possible design, the sending the first data packet, the identifier of the first terminal device, the identifier of the network device, an identifier of the second relay terminal device, and the identifier of the third relay terminal device to the second relay terminal device includes: sending an eighth data packet to the second relay terminal device. In a possible manner, the eighth data packet is obtained by encapsulating the first data packet with a sixth protocol header, and the sixth protocol header includes the identifier of the first terminal device, the identifier of the network device, the identifier of the second relay terminal device, and the identifier of the third relay terminal device.

In another possible manner, the eighth data packet may be obtained by modifying, based on the seventh data packet or a second data packet, content carried in a protocol header, or may be another data packet that carries the identifier of the first UE.

In a possible design, the determining that a next-hop node of the first data packet is a second relay terminal device includes: determining, based on third information associated with the first data packet, that the next-hop node of the first data packet is the third relay terminal device, where the third information includes at least one of the following information: an identifier of the source node, an identifier of the target node, an identifier of a previous-hop node, a data type, an identifier of a first data radio bearer (DRB), or quality of service (QOS) information.

In a possible design, the method may further include: determining a sixth logical channel based on fourth information associated with the first data packet, where the fourth information includes at least one of the following information: the identifier of the source node, the identifier of the target node, the identifier of the previous-hop node, an identifier of the next-hop node, the identifier of the first DRB, or the QoS information; and the sending the first data packet, the identifier of the first terminal device, the identifier of the network device, an identifier of the second relay terminal device, and the identifier of the third relay terminal device to the second relay terminal device includes: sending the first data packet, the identifier of the first terminal device, the identifier of the network device, the identifier of the second relay terminal device, and the identifier of the third relay terminal device to the second relay terminal device through the sixth logical channel.

In a possible design, the fifth protocol header may further include an identifier of a previous-hop node of the first terminal device, or the first data packet may include an identifier of a previous-hop node of the first terminal device. The identifier of the previous-hop node of the first terminal device is for determining first downlink routing table information, and the first downlink routing table information indicates a downlink route of the first terminal device.

According to a sixth aspect, an embodiment of this application provides a communication apparatus. The communication apparatus may be a first terminal device, or a component (such as a processor, a chip, or a chip system) of the first terminal device. The communication apparatus may include units configured to perform the steps in the first aspect.

According to a seventh aspect, an embodiment of this application provides a communication apparatus. The communication apparatus may be a first relay terminal device, or a component (such as a processor, a chip, or a chip system) of the first relay terminal device. The communication apparatus may include units configured to perform the steps in the second aspect.

According to an eighth aspect, an embodiment of this application provides a communication apparatus. The communication apparatus may be a second relay terminal device, or a component (such as a processor, a chip, or a chip system) of the second relay terminal device. The communication apparatus may include units configured to perform the steps in the third aspect.

According to a ninth aspect, an embodiment of this application provides a communication apparatus. The communication apparatus may be a network device, or a component (such as a processor, a chip, or a chip system) of the network device. The communication apparatus may include units configured to perform the steps in the fourth aspect.

According to a tenth aspect, an embodiment of this application provides a communication apparatus. The communication apparatus may be a third relay terminal device, or a component (such as a processor, a chip, or a chip system) of the third relay terminal device. The communication apparatus may include units configured to perform the steps in the fifth aspect.

According to an eleventh aspect, an embodiment of this application provides a communication apparatus, including a processor. The processor is coupled to a memory, the memory is configured to store instructions or a program, and when the instructions or the program are/is executed by the processor, the apparatus is enabled to perform the method provided in the first aspect, the method provided in the second aspect, the method provided in the third aspect, or the method provided in the fifth aspect.

According to a twelfth aspect, an embodiment of this application provides a communication apparatus, including a processor. The processor is coupled to a memory, the memory is configured to store instructions or a program, and when the instructions or the program are/is executed by the processor, the apparatus is enabled to perform the method provided in the fourth aspect.

According to a thirteenth aspect, an embodiment of this application provides a communication system, including a first terminal device that can implement the method provided in the first aspect, a first relay terminal device that can implement the method provided in the second aspect, a second relay terminal device that can implement the method provided in the third aspect, and a network device that can implement the method provided in the fourth aspect.

Optionally, the communication system may further include a third relay terminal device that can implement the method provided in the fifth aspect.

According to a fourteenth aspect, an embodiment of this application further provides a computer program. When the computer program is run on a computer, the computer is enabled to perform the method provided in any one of the foregoing aspects.

According to a fifteenth aspect, an embodiment of this application further provides a computer-readable storage medium. The computer-readable storage medium stores a computer program, and when the computer program is executed by a computer, the computer is enabled to perform the method provided in any one of the foregoing aspects.

According to a sixteenth aspect, an embodiment of this application further provides a chip. The chip is configured to read a computer program stored in a memory, to perform the method provided in any one of the foregoing aspects.

According to a seventeenth aspect, an embodiment of this application further provides a chip system. The chip system includes a processor, configured to support a computer apparatus in implementing the method provided in any one of the foregoing aspects. In a possible design, the chip system further includes a memory, and the memory is configured to store a program and data that are necessary for the computer apparatus. The chip system may include a chip, or may include a chip and another discrete component.

DESCRIPTION OF EMBODIMENTS

Figure 1:
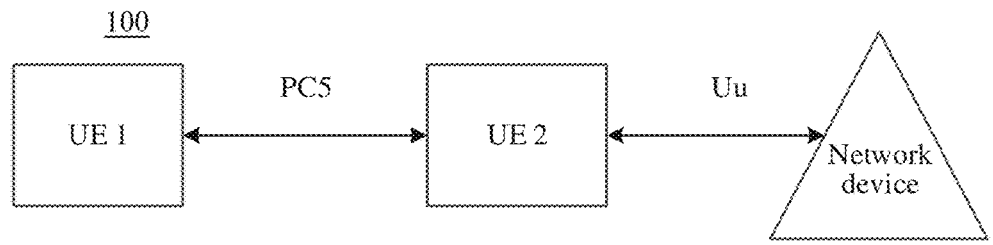
FIG. 1 is a schematic diagram of a structure of a communication system to which an embodiment of this application is applicable.

This application provides a routing method, an apparatus, and a system, to implement routing between a network device and remote UE, and ensure that communication can be performed between the network device and the remote UE. The method and the device are based on a same technical concept. Because problem-resolving principles of the method and the apparatus are similar, mutual reference may be made to implementation of the device and the method. Repeated parts are not described again.

The following describes some terms in this application, to facilitate understanding of a person skilled in the art.

(1) A network device may be an access network device, for example, a radio access network (RAN) device, and is a device that provides a wireless communication function for a terminal device.

For example, the network device includes but is not limited to a next-generation NodeB (generation NodeB, gNB) in the 5th generation (5G), an evolved NodeB (eNB), a remote radio unit (RRU), a baseband unit (BBU), a transmitting and receiving point (TRP), a transmitting point (TP), a base station controller (BSC), a base transceiver station (BTS), a home base station (for example, a home evolved NodeB or home NodeB, HNB), a base station in a future mobile communication system, an access point in a Wi-Fi system, or the like. Alternatively, the access network device may be a radio controller, a central unit (CU), and/or a distributed unit (DU) in a cloud radio access network (CRAN) scenario. Alternatively, the network device may be a relay node, a vehicle-mounted device, a network device in a future evolved network, or the like.

In embodiments of this application, an apparatus configured to implement a function of a network device may be a network device, or may be an apparatus that can support the network device in implementing the function, for example, a chip system. The apparatus may be installed in the network device. In embodiments of this application, the technical solutions provided in embodiments of this application are described by using an example in which the apparatus configured to implement a function of a network device is a network device.

(2) A terminal device is a device that provides voice and/or data connectivity for a user. The terminal device may also be referred to as a terminal, user equipment (UE), a mobile station (MS), a mobile terminal (MT), or the like. In embodiments and accompanying drawings of this application, UE is used as an example for description.

For example, the terminal may be a handheld device with a wireless connection function, various vehicle-mounted devices, a roadside unit, or the like. Currently, examples of some terminal devices are: a mobile phone, a tablet computer, a notebook computer, a palmtop computer, a mobile internet device (MID), a smart point of sale (POS), a wearable device, a virtual reality (VR) device, an augmented reality (AR) device, a head-mounted display (HMD), a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, various smart meters (such as a smart water meter, a smart electricity meter, and a smart gas meter), a device with an integrated access and backhaul (IAB) capability, a vehicle-mounted electronic control unit (ECU), a vehicle-mounted computer, a vehicle-mounted cruise system, a telematics box (T-BOX), and the like.

In embodiments of this application, an apparatus configured to implement a function of a terminal may be a terminal device, or may be an apparatus that can support the terminal device in implementing the function, for example, a chip system. The apparatus may be installed in the terminal device. In embodiments of this application, the chip system may include a chip, or may include a chip and another discrete component. In embodiments of this application, the technical solutions provided in embodiments of this application are described by using an example in which the apparatus configured to implement a function of a terminal device is a terminal device.

(3) A first protocol layer may be a media access control (MAC) layer, a radio link control (RLC) layer, a packet data convergence protocol (PDCP) layer, a physical (PHY) layer, or the like. For example, the first protocol layer may be an adaptation layer, for example, a backhaul adaptation protocol (BAP). In the following embodiments, an example in which the first protocol layer is BAP is used for description.

(4) A next-hop node may be a next node in a transmission direction, and may also be referred to as a next node. For example, remote UE sends a message to a network device through relay UE. A next-hop node of the remote UE is the relay UE, and a next-hop node of the relay UE is the network device. For another example, remote UE sends a message to relay UE. In this case, a next-hop node of the message may be the relay UE. The relay UE forwards the message to a network device. In this case, a next-hop node of the message may be the network device.

A previous-hop node may be a previous node in a transmission direction, and may also be referred to as a previous node. For example, remote UE sends a message to a network device through relay UE. A previous-hop node of the relay UE is the remote UE, and a previous-hop node of the network device is the relay UE. For another example, remote UE sends a message to relay UE. In this case, a previous-hop node of the message may be the remote UE. The relay UE forwards the message to a network device. In this case, although a previous-hop node of the relay UE is the remote UE, for the message, a previous-hop node of the message may be the relay UE.

A parent node may be a next-hop node in an uplink transmission direction, or a previous-hop node in a downlink transmission direction. For example, remote UE communicates with a network device through relay UE. In this scenario, the relay UE is a parent node of the remote UE, and the network device is a parent node of the relay UE.

Correspondingly, a child node may be a previous-hop node in an uplink transmission direction, or a next-hop node in a downlink transmission direction. For example, remote UE communicates with a network device through relay UE. In this scenario, the relay UE is a child node of the network device, and the remote UE is a child node of the relay UE.

(5) Single-hop may mean that data or a message is sent from a source node and reaches a target node through one intermediate node. For example, a source node and a target node of a data packet are respectively remote UE and a network device. The remote UE sends the data packet to relay UE, and the relay UE forwards the data packet to the network device.

Multi-hop may mean that data or a message is sent from a source node and reaches a target node through two or more intermediate nodes. For example, a source node and a target node of a message are respectively remote UE and a network device. The remote UE sends the message to relay UE 1, the relay UE 1 forwards the message to relay UE 2, and the relay UE 2 forwards the message to the network device.

(6) "And/or" describes an association relationship of associated objects, and indicates that three relationships may exist. For example, A and/or B may indicate the following three cases: Only A exists, both A and B exist, and only B exists. The character "/" usually indicates an "or" relationship between the associated objects.

It should be noted that "a plurality of" in this application means two or more than two. "At least one" means one or more.

In addition, it should be understood that in the description of this application, words such as "first" and "second" are merely used for distinguishing, and cannot be understood as an indication or implication of relative importance or an indication or implication of a sequence.

To facilitate understanding of embodiments of this application, the following describes a communication system to which embodiments of this application are applicable.

To effectively improve coverage of a network device, one or more relay UEs may be introduced to form single-hop communication or multi-hop communication, to assist remote UE in communicating with the network device. The single-hop communication may be shown in FIG. 1, and the multi-hop communication may be shown in FIG. 2 or FIG. 3.

FIG. 1 is a schematic diagram of a communication system to which an embodiment of this application is applicable. As shown in FIG. 1, the communication system 100 may include a network device, UE 1, and UE 2. UE 1 may send data (or a message) to the network device through UE 2. The network device may send data (or a message) to UE 1 through UE 2. UE 1-UE 2-network device in the communication system 100 forms single-hop communication.

Figure 2:
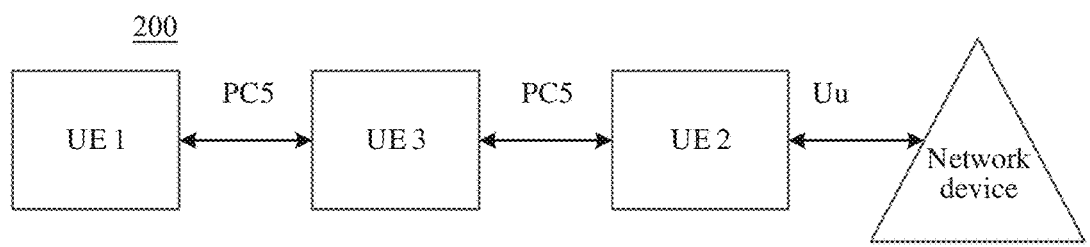
FIG. 2 is a schematic diagram of another structure of a communication system to which an embodiment of this application is applicable.

FIG. 2 is a schematic diagram of another communication system to which an embodiment of this application is applicable. As shown in FIG. 2, the communication system 200 may include a network device, UE 1, UE 2, and UE 3. UE 1 may send data (or a message) to the network device through UE 2 and UE 3. The network device may send data (or a message) to UE 1 through UE 2 and UE 3. UE 1-UE 3-UE 2-network device in the communication system 200 forms multi-hop communication.

Figure 3:
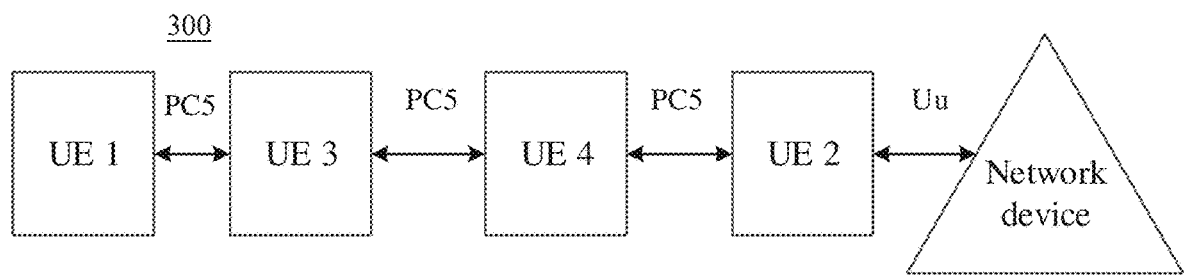
FIG. 3 is a schematic diagram of another structure of a communication system to which an embodiment of this application is applicable.

FIG. 3 is a schematic diagram of another communication system to which an embodiment of this application is applicable. As shown in FIG. 3, the communication system 300 may include a network device, UE 1, UE 2, UE 3, and UE 4. UE 1 may send data (or a message) to the network device through UE 2, UE 3, and UE 4. The network device may send data (or a message) to UE 1 through UE 2, UE 3, and UE 4. UE 1-UE 3-UE 4-UE 2-network device in the communication system 300 forms multi-hop communication.

To distinguish between UEs in terms of functions, two concepts: relay UE and remote UE, are introduced in embodiments of this application.

As a bridge device of remote UE, relay UE can establish a connection between one device (remote UE or relay UE) and another device (relay UE or network device), so that the two devices can communicate with each other. For example, UE 2 in FIG. 1, FIG. 2, and FIG. 3, UE 3 in FIG. 2 and FIG. 3, and UE 4 in FIG. 3 each are relay UE.

Remote UE may be a service initiation device, a destination device that finally receives user data, or a source device that generates user data. In other words, the remote UE is one endpoint of a communication link (for example, an RRC connection), and the other endpoint is a network device. For example, UE 1 in FIG. 1, FIG. 2, and FIG. 3 is remote UE.

For ease of description, a plurality of relay UEs in a multi-hop communication scenario may be classified into three types based on locations of the relay UEs relative to remote UE or a network device.

Head relay UE may be relay UE directly connected to the network device, for example, UE 3 in FIG. 2 and FIG. 3.

Tail relay UE may be relay UE directly connected to the remote UE, for example, UE 2 in FIG. 2 and FIG. 3.

Common relay UE may be relay UE located between the head relay UE and the tail relay UE, for example, UE 4 in FIG. 3.

It may be understood that, when there are two relay UEs between the network device and the remote UE, one of the two relay UEs is head relay UE, and the other is tail relay UE, as shown in FIG. 2. Only when there are three or more relay UEs between the network device and the remote UE, the relay UEs include the foregoing three types of relay UEs, as shown in FIG. 3.

It should be noted that the communication system shown in FIG. 1, FIG. 2, or FIG. 3 is used as an example, and constitutes no limitation on a communication system to which the method provided in embodiments of this application is applicable. In summary, the method provided in embodiments of this application is applicable to various communication systems that support a single-hop communication technology or a multi-hop communication technology, for example, a UE-to-UE relay (UE to UE relay, U2U relay) system. Embodiments of this application may be further applied to communication systems of various types and standards, for example, a 5th generation (5G) communication system, a long term evolution (LTE) communication system, vehicle to everything (V2X), long term evolution-vehicle (LTE-vehicle, LTE-V), vehicle to vehicle (vehicle to vehicle, V2V), the internet of vehicles, machine type communication (MTC), the internet of things (IoT), long term evolution-machine to machine (LTE-machine to machine, LTE-M), machine to machine (M2M), and an enterprise LTE discrete spectrum aggregation (eLTE-DSA) system. This is not limited in embodiments of this application. For ease of description, a UE-to-network relay scenario is used as an example for description in embodiments of this application.

The following describes some technical features in embodiments of this application.

Figure 4:
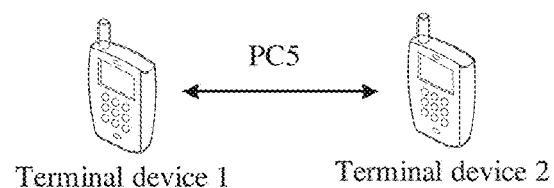
FIG. 4 is a schematic diagram of communication between UEs through a PC5 interface according to an embodiment of this application.

In a wireless communication system, UE 1 and UE 2 may perform data communication by using a network, or may directly perform communication without using a network device. An interface between UE 1 and UE 2 is referred to as a PC5 interface, and communication between UE and a network device may be performed by using a Uu interface. The PC5 interface is shown in FIG. 4. A link between UE 1 and UE 2 is referred to as a sidelink (SL), and a typical application scenario of sidelink communication is a V2X system. In the V2X system, each vehicle may be considered as one UE, and data transmission may be directly performed between UEs by using the sidelink without using a network device. Therefore, a communication delay can be effectively reduced.

In the sidelink communication, broadcast communication, unicast communication, or multicast communication is supported. The broadcast communication in the sidelink communication is similar to broadcasting system information by a network device to UE. To be specific, UE at a transmit end directly broadcasts service data without performing encryption processing on the service data, and any other UE in a valid receiving range may receive the service data if the UE is interested in the service data. The unicast communication in the sidelink communication is similar to data communication performed after an RRC connection is established between UE and a network device. In other words, a unicast connection needs to be first established between two UEs. After the unicast connection is established, the two UEs may perform data communication based on a negotiated communication identifier. In a communication process, transmitted data may be encrypted or may not be encrypted. Compared with the broadcast communication, in the unicast communication, only two UEs that have established a unicast connection can communicate with each other. The multicast communication in the sidelink communication means that one UE in a communication group sends multicast service data, and all other UEs in the communication group can receive the multicast service data.

In a UE-to-network relay scenario, remote UE is at an edge of network coverage or is not within network coverage, and the remote UE may communicate with a network device through relay UE. From a perspective of a user plane protocol stack, a relay process may be implemented by using two protocol architectures, one is layer 3 (L3) relay, and the other is L2 relay. The following describes embodiments of this application by using an L2 relay architecture as an example.

Figure 5:
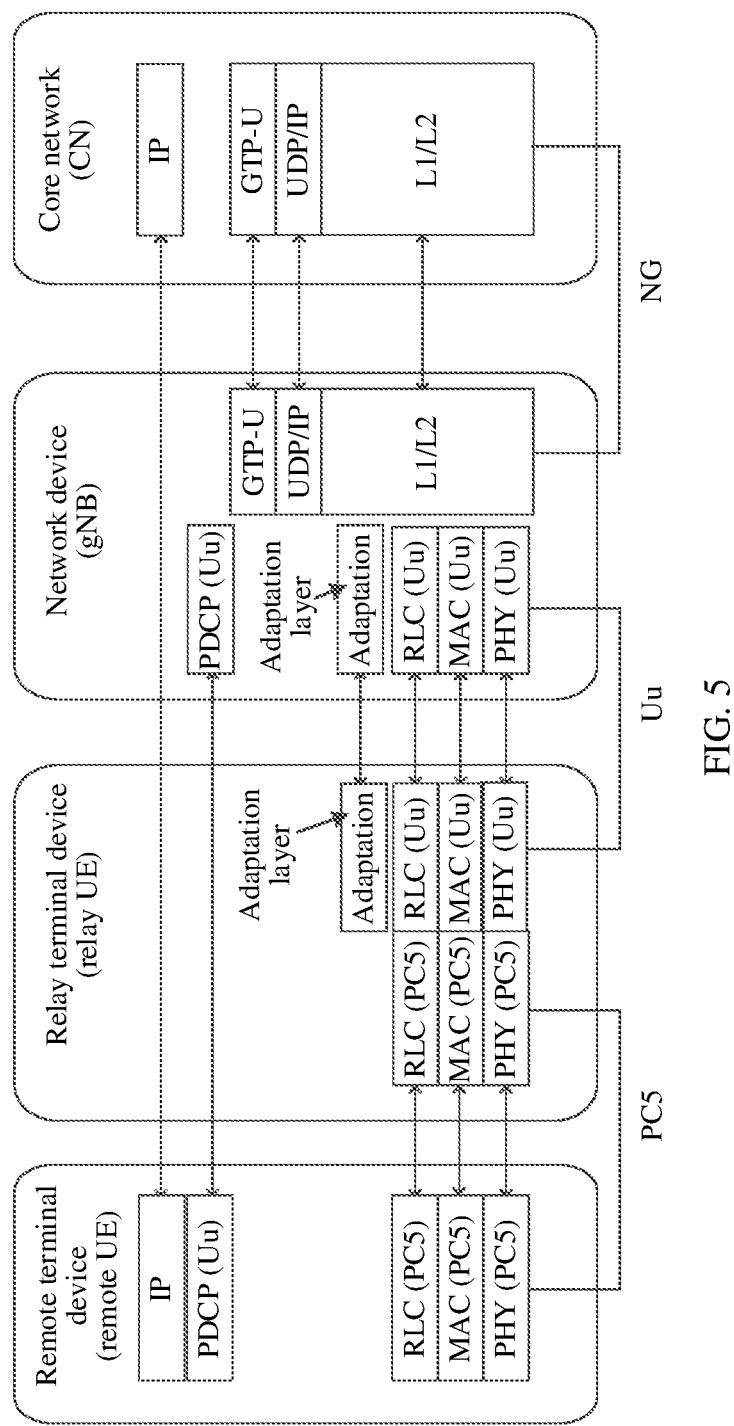
FIG. 5 is a schematic diagram of a protocol stack according to an embodiment of this application.

In the L2 relay architecture, user data may be relayed below a packet data convergence protocol (PDCP) layer. In this case, a schematic diagram of the user plane protocol stack is shown in FIG. 5. FIG. 5 shows an L2 architecture designed based on an NR system. A protocol stack between relay UE and a network device may include an adaptation layer, and the adaptation layer is above a radio link control (RLC) layer and below a PDCP layer. The adaptation layer may be used to distinguish between a plurality of remote UEs connected to the relay UE, to implement routing between the remote UE and the network device in a U2N system.

Uplink transmission is used as an example. Relay UE is connected to a plurality of remote UEs. After receiving a data packet from remote UE, the relay UE determines that the data packet needs to be forwarded to a network device. To enable the network device to identify which remote UE sends the data packet, the relay UE may add a local identifier of the remote UE at an adaptation layer, and the local identifier can uniquely identify one remote UE within a range of the relay UE, so that the relay UE and the network device clearly distinguish between all remote UEs. In this way, after receiving the data packet forwarded by the relay UE, the network device may determine a source node of the data packet based on the local identifier at the adaptation layer.

However, when there are a plurality of relay UEs between the remote UE and the network device, each of the plurality of relay UEs may configure a local identifier for UE (remote UE or relay UE) within a range of the relay UE. In this case, a same local identifier may identify different UEs with respect to different relay UEs. In an example, UE 3 is connected to UE 1 and UE 5, and configures local identifiers for UE 1 and UE 5, which are respectively local identifier 1 and local identifier 2. UE 2 is connected to UE 6, and configures a local identifier for UE 6, where the local identifier is local identifier 1. It can be learned that local identifier 1 is used to identify UE 1 within a range of UE 3, and is used to identify UE 6 within a range of UE 2. In this case, in an uplink transmission direction, the network device cannot determine, based on local identifier 1, whether a source node of received data is UE 5 or UE 6. In a downlink transmission direction, UE 2 cannot determine, based on local identifier 1, whether to send data to UE 6 or forward data to UE 3. Consequently, UE 1 cannot communicate with the network device.

In view of this, embodiments of this application provide a routing method, an apparatus, and a system, to implement routing between remote UE and a network device, to ensure that communication can be performed between the remote UE and the network device. It should be noted that the method and the apparatus may be applied to a multi-hop communication scenario, and may be applied to another scenario. Particularly, the method and the apparatus are used to implement routing between a network device and remote UE in the multi-hop communication scenario.

The following separately uses the communication systems shown in FIG. 1, FIG. 2, and FIG. 3 as examples to describe the routing method provided in embodiments of this application.

It should be noted that, in the following embodiments, a step performed by a network device may also be specifically performed by a module or component of the network device, for example, may be performed by a chip or a chip system in the network device. A step performed by UE (for example, remote UE or relay UE) may also be specifically performed by a module or component of the UE (for example, remote UE or relay UE), for example, may be performed by a chip or a chip system in the UE (for example, remote UE or relay UE). This is not limited in embodiments of this application.

Embodiment 1

In this embodiment, the communication system 100 shown in FIG. 1 is used as an example to describe an uplink routing process in which first UE determines that a next-hop node of a first data packet is first relay UE, and sends the first data packet to a network device through the first relay UE. The first UE may be UE 1 shown in FIG. 1, the first relay UE may be UE 2 shown in FIG. 1, and the network device may be the network device shown in FIG. 1. It may be understood that, in this embodiment, the first relay UE (that is, UE 2) is both head relay UE and tail relay UE. The following describes in detail a method in this embodiment with reference to a schematic flowchart of a routing method shown in FIG. 6.

S601: The network device sends a first message. Correspondingly, UE 1 receives the first message.

The first message may include an identifier of the network device, and the first message may be a system information block (SIB), a discovery message, or the like. The identifier of the network device may be a layer 2 (L2) ID of the network device, or may be a BAP address of the network device, or may be another unique identifier, or may be another identifier that can be used to identify the network device. This is not limited in this embodiment of this application. For ease of description, an example in which the identifier of the network device is the L2 ID is used below for description.

For example, the network device may periodically or aperiodically broadcast the first message within a range of the network device. Correspondingly, UE 2 within the range of the network device may receive the first message. After receiving the first message, UE 2 may send the first message to UE 1 in a unicast form, or broadcast the first message within a range of UE 2 in a broadcast form. Correspondingly, UE 1 may receive the first message. For example, the first message may be a PC5-RRC message or an SL-SIB message.

For example, there is an RRC connection between the network device and UE 2, and the network device and UE 2 may communicate with each other by using a Uu interface. There is an SL connection between UE 2 and UE 1, and UE 2 and UE 1 may communicate with each other by using a PC5 interface. Optionally, UE 1 may communicate with the network device by using UE 2.

In a possible implementation, step S601 may be an optional step. For example, the identifier of the network device may be predefined by a system.

S602: UE 1 generates a first data packet.

For example, the first data packet may include a second message, or include first data, or include a second message and first data, or include default information. This is not limited in this embodiment of this application.

The second message may be RRC signaling, such as an RRC connection setup request message used to request to establish an RRC connection to the network device, an RRC connection reestablishment request message used to request to reestablish an RRC connection to the network device, or an RRC reconfiguration complete message used to indicate completion of RRC connection reconfiguration. For example, when UE 1 is in an idle mode, UE 1 may generate the first data packet based on the RRC connection setup request message, and send the first data packet to the network device, to request to establish an RRC connection to the network device, to enter a connected mode. Optionally, the second message may alternatively be non-access stratum (NAS) signaling.

The first data may be data sent by UE 1 to the network device. Specific content and/or a form of the first data are/is not limited in this embodiment of this application. For example, when UE 1 is in a connected mode, UE 1 may generate the first data packet based on to-be-sent data, and send the first data packet to the network device.

S603: UE 1 determines that a target node of the first data packet is the network device.

In an example, UE 1 may determine, based on the first message, that the target node of the first data packet is the network device. For example, the target node of the first data packet may be a network device indicated by an identifier of the network device carried in the first message. For example, after receiving the first message, if UE 1 in an idle mode wants to enter a connected mode, UE 1 may generate the first data packet based on the RRC connection setup request message, and send the first data packet to the network device indicated by the identifier of the network device carried in the first message.

In another example, UE 1 may determine, according to system predefinition, that the target node of the first data packet is the network device. For example, the target node of the first data packet may be a network device predefined in a system. For example, if UE 1 needs to send data to the network device predefined in the system, UE 1 may generate the first data packet based on the data, and send the first data packet to the network device predefined in the system.

S604: UE 1 determines that a next-hop node of the first data packet is UE 2.

For example, UE 1 may autonomously create routing table information, and the routing table information may be used to determine a route of a to-be-sent data packet of UE 1. For example, the routing table information may include an identifier of a next-hop node. Optionally, the routing table information may further include at least one of an identifier of a source node, an identifier of a target node, or an identifier of a previous-hop node, as shown in Table 1.

TABLE 1

| Autonomously created routing table information | | | |
|---|---|---|---|
| Identifier of a source node | Identifier of a target node | Identifier of a previous-hop node | Identifier of a next-hop node |

In this embodiment of this application, because the first data packet is generated by UE 1, in an uplink transmission direction, both a source node and a previous-hop node of the first data packet are UE 1, that is, an identifier of the source node of the first data packet is an identifier of UE 1, and an identifier of the previous-hop node is also the identifier of UE 1. The identifier of UE 1 may be an L2 ID of UE 1, or may be a BAP address of UE 1, or may be another unique identifier, or may be another identifier that can be used to identify UE 1. This is not limited in this embodiment of this application. For ease of description, an example in which the identifier of UE 1 is the L2 ID of UE 1 is used below for description.

For example, UE 1 may determine that the next-hop node of the first data packet is UE 2, and obtain an identifier of UE 2. For example, UE 1 may determine the next-hop node of the first data packet from one or more accessed relay UEs.

For example, when UE 1 establishes an SL connection to only one relay UE, UE 1 may determine that the relay UE is the next-hop node of the first data packet, and obtain an identifier of the relay UE by using the SL connection to the relay UE. For example, when UE 1 establishes an SL connection to a plurality of relay UEs, UE 1 may select one relay UE from the plurality of relay UEs as the next-hop node of the first data packet. For another example, when UE 1 establishes an SL connection to a plurality of relay UEs, UE 1 may determine the next-hop node of the first data packet based on first information associated with the first data packet. The identifier of UE 2 may be an L2 ID of UE 2, or may be a BAP address of UE 2, or may be another unique identifier, or may be another identifier that can be used to identify UE 2. This is not limited in this embodiment of this application. For ease of description, an example in which the identifier of UE 2 is the L2 ID of UE 2 is used below for description.

The first information associated with the first data packet may include at least one of the following information: a data type, a message type, port information, quality of service (QOS) information, or the like. The data type may include control signaling, data, default information, or the like. The control signaling may further include RRC signaling, NAS signaling, and the like. The message type may include NAS signaling, RRC connection setup request message, RRC connection reestablishment request message, RRC reconfiguration complete message, or the like. The port information may include a port number and/or an internet protocol (IP) address. The QoS information may include a 5G quality of service identifier (5G QOS ID, 5QI), a quality of service flow identifier/index (QOS flow ID/index), or the like.

For example, UE 1 may send data packets of different data types to different nodes, and UE 1 may determine the next-hop node of the first data packet based on the data type of the first data packet. For example, if the data type of the first data packet is control signaling, UE 1 may determine that a next-hop node corresponding to the control signaling is the next-hop node of the first data packet. For example, if the data type of the first data packet is data, UE 1 may determine that a next-hop node corresponding to the data is the next-hop node of the first data packet. For another example, if the data type of the first data packet is default information, UE 1 may determine that a next-hop node corresponding to the default information is the next-hop node of the first data packet.

For example, UE 1 may send data packets of different message types to different nodes, and UE 1 may determine the next-hop node of the first data packet based on a message type of a second message included in the first data packet. For example, if the message type of the second message is RRC connection setup request message, UE 1 may determine that a next-hop node corresponding to the RRC connection setup request message is the next-hop node of the first data packet. For example, if the message type of the second message is RRC connection reestablishment request message, UE 1 may determine that a next-hop node corresponding to the RRC connection reestablishment request message is the next-hop node of the first data packet. For example, if the message type of the second message is RRC reconfiguration complete message, UE 1 may determine that a next-hop node corresponding to the RRC reconfiguration complete message is the next-hop node of the first data packet.

For example, UE 1 may send data packets with different port information to different nodes, and UE 1 may determine the next-hop node of the first data packet based on the port information. For example, if the first data packet is output from port 1, UE 1 may determine that a next-hop node corresponding to port 1 is the next-hop node of the first data packet. For example, if an IP address of the target node of the first data packet is IP address 1, UE 1 may determine that a next-hop node corresponding to IP address 1 is the next-hop node of the first data packet. For another example, if the first data packet is output from port 1, and an IP address of the target node of the first data packet is IP address 1, UE 1 may determine that a next-hop node corresponding to port 1 and IP address 1 is the next-hop nodes of the first data packet.

For example, UE 1 may send data packets with different QoS information to different nodes, and UE 1 may determine the next-hop node of the first data packet based on the QoS information. For example, if a quality of service requirement of the first data packet is quality of service indicated by 5QI 1, UE 1 may determine that a next-hop node corresponding to 5QI 1 is the next-hop node of the first data packet. For example, if quality of service of the first data packet is quality of service indicated by quality of service flow identifier 1, UE 1 may determine that a next-hop node corresponding to quality of service flow identifier 1 is the next-hop node of the first data packet.

It may be understood that UE 1 may alternatively send data packets of different data types to a same node, or send data packets of different message types to a same node, or send data packets with different port information to a same node, or send data packets with different QoS information to a same node, or the like. This is not limited in this embodiment of this application.

It may be understood that UE 1 may alternatively determine the next-hop node of the first data packet based on at least two of the data type, the message type, the port information, or the QoS information. A specific implementation is similar to the foregoing implementation of determining the next-hop node of the first data packet based on the data type, the message type, the port information, or the QoS information, and details are not listed one by one herein.

In an example, in a U2N system, a bearer between remote UE and a network device is a signaling radio bearer (SRB) or a data radio bearer (DRB). For example, one or more SRBs such as SRB 0, SRB 1, or SRB 2 may be established between the remote UE and the network device, and one or more DRBs such as DRB 0, DRB 1, DRB 2, or DRB 3 may be established between the remote UE and the network device. For example, RRC signaling is sent to the network device by using the SRB, and data is sent to the network device by using the DRB. It may be understood that a quantity of SRBs and a quantity of DRBs are merely examples, and this is not limited in this embodiment of this application.

For the SRB and the DRB, a manner in which UE 1 determines the next-hop node based on the first information associated with the first data packet may further be shown as follows.

(1) For the SRB: All SRBs may be mapped to a same next-hop node, or SRBs may be mapped to different next-hop nodes based on message types. For example, when the first data packet includes a second message, and a next-hop node of the second message is UE 2, UE 1 may determine that the next-hop node of the first data packet is UE 2. For another example, when the first data packet includes a second message, UE 1 may determine, based on a message type of the second message, that the next-hop node of the first data packet is UE 2. The message type may be classified into RRC signaling, NAS signaling, and the like. Further, the RRC signaling may be classified into an RRC connection setup request message, an RRC connection reestablishment request message, an RRC reconfiguration complete message, or the like.

For example, there is an SL connection between UE 1 and each of UE 2 and UE 5. All SRBs are mapped to UE 2. As shown in Table 2, SRB 0, SRB 1, and SRB 2 are mapped to UE 2. In this case, when the first data packet generated by UE 1 includes a second message, that is, when the data type of the first data packet is control signaling, UE 1 may directly determine that the next-hop node of the first data packet is UE 2. Further, UE 1 may obtain an identifier of UE 2 based on the SL connection to UE 2. It may be understood that each piece of data in Table 2 is merely an example, and this embodiment of this application is not limited thereto.

TABLE 2

| All SRBs are mapped to a same next-hop node | |
|---|---|
| SRB | Next-hop node |
| SRB 0 | UE 2 |
| SRB 1 | UE 2 |
| SRB 2 | UE 2 |

For example, there is an SL connection between UE 1 and each of UE 2 and UE 5. SRBs may be mapped to different next-hop nodes based on message types. As shown in Table 3, SRB 0 that carries an RRC connection setup request message may be mapped to UE 2, SRB 0 that carries an RRC connection reestablishment request message may be mapped to UE 5, SRB 1 that carries an RRC reconfiguration complete message may be mapped to UE 2, and SRB 1 or SRB 2 that carries NAS signaling may be mapped to UE 5. In this case, UE 1 may determine the next-hop node of the first data packet based on a message type of a second message. For example, if the second message is an RRC connection setup request message, UE 1 may determine that the next-hop node of the first data packet is UE 2. For another example, if the second message is NAS signaling, UE 1 may determine that the next-hop node of the first data packet is UE 5. It may be understood that each piece of data in Table 3 is merely an example, and this embodiment of this application is not limited thereto.

TABLE 3

| SRBs are mapped to different next-hop nodes based on message types | | |
|---|---|---|
| Message type | SRB | Next-hop node |
| RRC connection setup request message | SRB 0 | UE 2 |
| RRC connection reestablishment request message | SRB 0 | UE 5 |
| RRC reconfiguration complete message | SRB 1 | UE 2 |
| NAS | SRB 1 | UE 5 |
| NAS | SRB 2 | UE 5 |

(2) For the DRB: DRBs may be mapped to different next-hop nodes based on port information and/or QoS information. For example, when the first data packet includes first data, UE 1 may determine, based on port information (such as a port number and/or an IP address) required for transmitting the first data, that the next-hop node of the first data packet is UE 2. For example, when the first data packet includes first data, UE 1 may determine, based on QoS information required for transmitting the first data, that the next-hop node of the first data packet is UE 2. For another example, when the first data packet includes first data, UE 1 may determine, based on port information required for transmitting the first data and QoS information required for transmitting the first data, that the next-hop node of the first data packet is UE 2.

For example, there is an SL connection between UE 1 and each of UE 2 and UE 5. DRBs may be mapped to different next-hop nodes based on port information and/or QoS information. As shown in Table 4, if data is output from port 1, DRB 0 that carries the data may be mapped to UE 2. If data is output from port 2, DRB 1 that carries the data may be mapped to UE 5. If QoS information required for data is QoS flow 1, DRB 2 that carries the data may be mapped to UE 2. If QoS information required for data is QoS flow 2, DRB 3 that carries the data may be mapped to UE 5. If data is output from port 1, and QoS information required for the data is QOS flow 3, DRB 4 that carries the data may be mapped to UE 2. In this case, UE 1 may determine the next-hop node of the first data packet based on the port information and/or the QoS information. For example, if the first data is output from port 1, UE 1 may determine that the next-hop node of the first data packet is UE 2. For example, if the QoS information required for the first data is QoS flow 2, UE 1 may determine that the next-hop node of the first data packet is UE 5. For another example, if the first data is output from port 1, and the QoS information required for the first data is QoS flow 3, UE 1 may determine that the next-hop node of the first data packet is UE 2. It may be understood that each piece of data in Table 4 is merely an example, and this embodiment of this application is not limited thereto.

TABLE 4

| DRBs are mapped to different next-hop nodes based on port information and/or QoS information | | | |
|---|---|---|---|
| Port information | QoS information | DRB | Next-hop node |
| Port 1 | | DRB 0 | UE 2 |
| Port 2 | | DRB 1 | UE 5 |
| | QoS flow 1 | DRB 2 | UE 2 |
| | QoS flow 2 | DRB 3 | UE 5 |
| Port 1 | QoS flow 3 | DRB 4 | UE 2 |

It may be understood that UE may map DRBs to different next-hop nodes based on port information and/or QoS information, or may map DRBs to different next-hop nodes based on one or more pieces of other information, such as identifiers of the DRBs, an identifier of a source node, or an identifier of a target node. For a specific implementation, refer to content in Table 4. This is not limited in this embodiment of this application.

It may be understood that if the first data packet is transmitted to the network device by using the SRB, the data type of the first data packet is control signaling, that is, the first data packet includes the second message. If the first data packet is transmitted to the network device by using the DRB, the data type of the first data packet is data, that is, the first data packet includes the first data.

In this case, UE 1 completes determining routing information of the first data packet. To be specific, the source node of the first data packet is UE 1, the target node of the first data packet is the network device, the previous-hop node of the first data packet is UE 1, and the next-hop node of the first data packet is UE 2.

S605: UE 1 sends the first data packet, the identifier of UE 1, the identifier of the network device, and the identifier of UE 2 to UE 2. Correspondingly, UE 2 receives the first data packet, the identifier of UE 1, the identifier of the network device, and the identifier of UE 2.

For example, there are a plurality of possible manners for transmitting a data packet and a plurality of identifiers associated with the data packet between UEs. An example in which UE 1 transmits the first data packet (an example of the data packet), the identifier of UE 1, the identifier of the network device, and the identifier of UE 2 (an example of the plurality of identifiers) to UE 2 is used for description.

In a possible manner, transmitting UE may directly send a data packet and a plurality of identifiers to receiving UE. For example, UE 1 may directly send the first data packet, the identifier of UE 1, the identifier of the network device, and the identifier of UE 2 to UE 2.

In another possible manner, transmitting UE may encapsulate the data packet with a protocol header to obtain a new data packet, where the protocol header includes the plurality of identifiers. For example, the protocol header may be a BAP header. For example, UE 1 may send a second data packet (an example of the new data packet) to UE 2, and the second data packet may be obtained by UE 1 by encapsulating the first data packet with a first protocol header. Correspondingly, UE 2 receives the second data packet. The first protocol header may include the identifier of UE 1, the identifier of the network device, and the identifier of UE 2. The first protocol header belongs to a first protocol layer. For example, the first protocol layer may be a BAP layer. Correspondingly, the first protocol header is a first BAP header.

Figure 7:
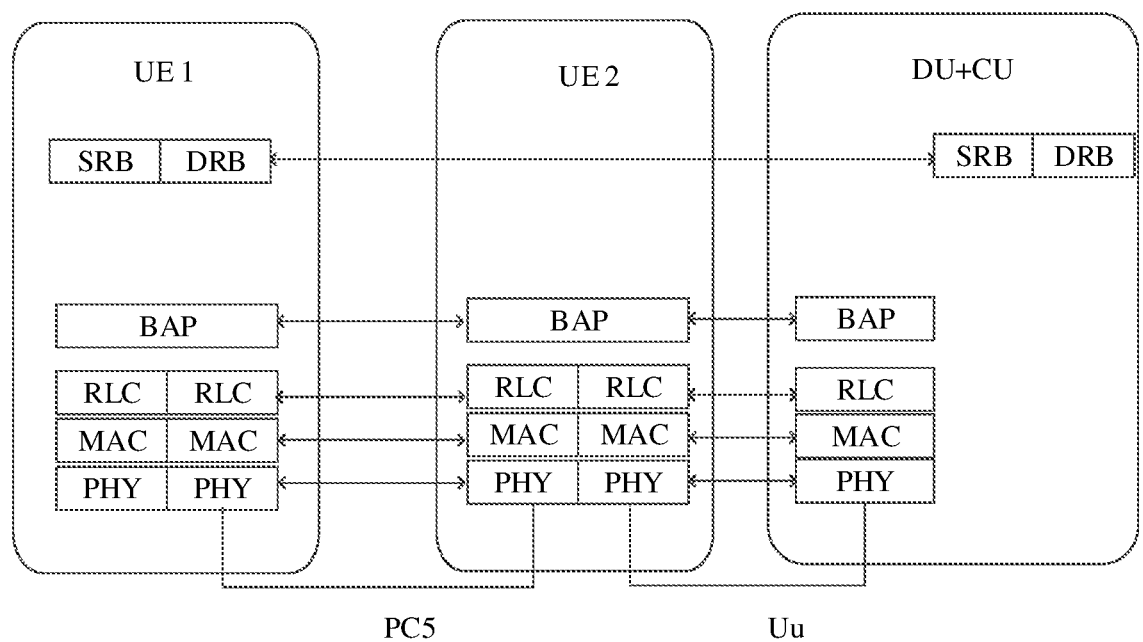
FIG. 7 is a schematic diagram in which a protocol stack includes a BAP layer according to an embodiment of this application.

To enable relay UE and the network device to clearly distinguish between one or more remote UEs connected to each remote UE, a BAP layer may be added to a protocol stack, and the BAP layer may be used for routing, bearer mapping, and the like, as shown in FIG. 7. FIG. 7 shows a possible architecture. The BAP layer may be above an RLC layer and below an SRB/DRB. For example, UE 1 encapsulates a data packet with a BAP header, where the BAP header includes routing information; and sends an encapsulated data packet to UE 2. Then, UE 2 may determine a next-hop node based on the routing information included in the BAP header.

In an example, there are one or more logical channels between UEs for carrying a data packet and a plurality of identifiers associated with the data packet. For example, UE 1 may send the first data packet, the identifier of UE 1, the identifier of the network device, and the identifier of UE 2 to UE 2 through a first logical channel. For another example, UE 1 may send the second data packet to UE 2 through a first logical channel. An example in which UE 1 sends the second data packet to UE 2 through the first logical channel is used below for description.

In a possible manner, there are one or more logical channels between transmitting UE and receiving UE, and the transmitting UE may directly select one logical channel from the one or more logical channels to carry the data packet and the plurality of identifiers associated with the data packet. For example, UE 1 may directly select the first logical channel from one or more logical channels existing between UE 1 and UE 2, to carry the second data packet.

In another possible manner, there are one or more logical channels between transmitting UE and receiving UE, and the transmitting UE may determine one logical channel from the one or more logical channels based on second information associated with the data packet, to carry the data packet and the plurality of identifiers associated with the data packet. For example, UE 1 may select, based on second information associated with the first data packet, the first logical channel from one or more logical channels existing between UE 1 and UE 2, to carry the second data packet. The second information associated with the first data packet may include at least one of the following information: the data type, the message type, the port information, the QoS information, an identifier of a DRB, an identifier of a logical channel, or the like.

For example, if different DRBs are corresponding to different logical channels, UE 1 may determine the first logical channel based on the identifier of the DRB. For example, logical channel 1 and logical channel 2 exist between UE 1 and UE 2. If the identifier of the DRB is DRB 1, and DRB 1 corresponds to an identifier of logical channel 1, UE 1 may determine that the first logical channel is logical channel 1. If the identifier of the DRB is DRB 2, and DRB 2 corresponds to an identifier of logical channel 2, UE 1 may determine that the first logical channel is logical channel 2.

It may be understood that UE 1 may map data packets of different data types to different logical channels (or a same logical channel), or may map data packets of different message types to different logical channels (or a same logical channel), or may map data packets with different port information to different logical channels (or a same logical channel), or may map data packets with different QoS information to different logical channels (or a same logical channel). For a specific implementation, refer to the foregoing implementation in which UE 1 determines the next-hop node based on the first information. Details are not described herein again.

In an example, in a U2N system, a bearer between remote UE and a network device is an SRB or a DRB. For the SRB and the DRB, a manner in which UE 1 determines the first logical channel based on the second information associated with the first data packet may further be shown as follows.

(1) For the SRB: All SRBs may be mapped to a same logical channel, or SRBs may be mapped to different logical channels based on message types. For example, when the first data packet includes the second message, and a logical channel that carries the second message is the first logical channel, UE 1 may determine that the first logical channel is a logical channel that carries the second data packet. For another example, when the first data packet includes the second message, UE 1 may determine the first logical channel based on a message type of the second message.

Logical channel 1 and logical channel 2 between UE 1 and UE 2 are used as an example. All SRBs are mapped to logical channel 1. As shown in Table 5, SRB 0, SRB 1, and SRB 2 are mapped to logical channel 1. In this case, when the first data packet generated by UE 1 includes the second message, and the logical channel that carries the second message is logical channel 1, UE 1 may directly determine that the first logical channel is logical channel 1. It may be understood that each piece of data in Table 5 is merely an example, and this embodiment of this application is not limited thereto.

TABLE 5

All SRBs are mapped to a same logical channel

| SRB | Logical channel |
|---|---|
| SRB 0 | Logical channel 1 |

TABLE 5-continued

All SRBs are mapped to a same
logical channel

| | |
|---|---|
| SRB 1 | Logical channel 1 |
| SRB 2 | Logical channel 1 |

For example, logical channel 1 and logical channel 2 exist between UE 1 and UE 2. SRBs may be mapped to different logical channels based on message types. As shown in Table 6, SRB 0 that carries an RRC connection setup request message may be mapped to logical channel 1, SRB 0 that carries an RRC connection reestablishment request message may be mapped to logical channel 2, SRB 1 that carries an RRC reconfiguration complete message may be mapped to logical channel 1, and SRB 1 or SRB 2 that carries NAS signaling may be mapped to logical channel 2. In this case, UE 1 may determine the first logical channel based on the message type of the second message. For example, if the second message is an RRC connection setup request message, UE 1 may determine that the first logical channel is logical channel 1. For another example, if the second message is NAS signaling, UE 1 may determine that the first logical channel is logical channel 2. It may be understood that each piece of data in Table 6 is merely an example, and this embodiment of this application is not limited thereto.

TABLE 6

SRBs are mapped to different logical channels
based on message types

| Message type | SRB | Logical channel |
|---|---|---|
| RRC connection setup request message | SRB 0 | Logical channel 1 |
| RRC connection reestablishment request message | SRB 0 | Logical channel 2 |
| RRC reconfiguration complete message | SRB 1 | Logical channel 1 |
| NAS | SRB 1 | Logical channel 2 |
| NAS | SRB 2 | Logical channel 2 |

(2) For the DRB: DRBs may be mapped to different logical channels based on at least one of port information, QoS information, identifiers of the DRBs, or identifiers of the logical channels. For example, when the first data packet includes the first data, UE 1 may determine the first logical channel based on port information required for transmitting the first data. For example, when the first data packet includes the first data, UE 1 may determine the first logical channel based on QoS information required for transmitting the first data. For example, when the first data packet includes the first data, UE 1 may determine the first logical channel based on an identifier of a DRB corresponding to the first data. For another example, when the first data packet includes the first data, UE 1 may determine the first logical channel based on an identifier of a logical channel corresponding to the first data. There may be a correspondence between an identifier of a DRB and an identifier of a logical channel.

F For example, logical channel 1 and logical channel 2 exist between UE 1 and UE 2. DRBs may be mapped to different logical channels based on at least one of port information, QoS information, identifiers of the DRBs, or identifiers of the logical channels. As shown in Table 7, if data is output from port 1, a DRB that carries the data may be mapped to logical channel 1. If data is output from port 2, a DRB that carries the data may be mapped to logical channel 2. If QoS information required for data is QoS flow 1, a DRB that carries the data may be mapped to logical channel 1. If data is output from port 1, and QoS information required for the data is QoS flow 2, a DRB that carries the data may be mapped to logical channel 2. If data is carried by DRB 0, DRB 0 may be mapped to logical channel 1. If data is carried by DRB 1, DRB 1 may be mapped to logical channel 2. In this case, UE 1 may determine the first logical channel based on at least one of the port information, the QoS information, or the identifier of the DRB (or the identifier of the logical channel). For example, if the first data is output from port 1, UE 1 may determine that the first logical channel is logical channel 1. For example, if the first data is output from port 1, and QoS information required for the first data is QoS flow 2, UE 1 may determine that the first logical channel is logical channel 2. For another example, if the first data is carried by DRB 0, UE 1 may determine that the first logical channel is logical channel 1. It may be understood that each piece of data in Table 7 is merely an example, and this embodiment of this application is not limited thereto.

TABLE 7

DRBs are mapped to different logical channels

| Port information | QoS information | DRB identifier | Logical channel |
|---|---|---|---|
| Port 1 | | | Logical channel 1 |
| Port 2 | | | Logical channel 2 |
| | QoS flow 1 | | Logical channel 1 |
| Port 1 | QoS flow 2 | | Logical channel 2 |
| | | DRB 0 | Logical channel 1 |
| | | DRB 1 | Logical channel 2 |

In an implementation, when UE 1 has a child node, the first BAP header may further include an identifier of a child node of UE 1, for example, an identifier of a previous-hop node of UE 1. The identifier of the child node of UE 1 may be used by the network device to configure first downlink routing table information for UE 1. The first downlink routing table information is for determining a downlink route of UE 1. For example, the child node of UE 1 is UE 5, and the network device may determine a topology relationship of UE 1 for UE 5 based on the child node of UE 1, and configure the first downlink routing table information for UE 1 based on the topology relationship of UE 1.

In an implementation, an identifier of a parent node of UE 1 included in the first BAP header, for example, the identifier of UE 2, may be used by the network device to configure second downlink routing table information for UE 2. The second downlink routing table information is for determining a downlink route of UE 2. For example, the parent node of UE 1 is UE 2, and the network device may determine a topology relationship of UE 2 for UE 1 based on a child node of UE 2, and configure the second downlink routing table information for UE 2 based on the topology relationship of UE 2.

In another implementation, the first data packet may include an identifier of a child node of UE 1 and/or an identifier of a parent node of UE 1. For example, the first data packet may include the identifier of the child node of UE 1, so that the network device may configure the first downlink routing table information for UE 1. Alternatively, the first data packet may include the identifier of the parent node of UE 1, so that the network device may configure the second downlink routing table information for UE 2. Alternatively, the first data packet may include the identifier of the child node of UE 1 and the identifier of the parent node of UE 1, so that the network device may separately configure downlink routing table information for UE 1 and UE 2.

S606: UE 2 determines that a next-hop node of the first data packet is the network device.

For example, UE 2 may receive the first data packet, the identifier of UE 1, the identifier of the network device, and the identifier of UE 2 from UE 1. Alternatively, UE 2 may receive the first data packet from UE 1. Further, UE 2 may decapsulate the first data packet to obtain the first data packet and the first BAP header. The first BAP header includes the identifier of UE 1, the identifier of the network device, and the identifier of UE 2. Then, UE 2 may determine that the next-hop node of the first data packet is the network device.

In an example, UE 2 may autonomously create routing table information. The routing table information may be used to determine a route of a to-be-sent data packet of UE 2, for example, an identifier of a source node, an identifier of a target node, an identifier of a previous-hop node, and an identifier of a next-hop node, as shown in Table 1. For example, UE 2 may determine, based on the first message or system predefinition, that the target node of the first data packet is the network device. For example, UE 2 may determine, based on the first BAP header, that the source node of the first data packet is UE 1. For another example, because the target node of the first data packet is not UE 2, and UE 2 needs to forward the first data packet, UE 2 may determine that the previous-hop node of the first data packet is UE 2. For another example, because UE 2 is directly connected to the network device, UE 2 may determine that the next-hop node of the first data packet is the network device.

In another example, because UE 2 is directly connected to the network device, the routing table information autonomously created by UE 2 may include only the identifier of the source node. In this way, it is ensured that the network device can clearly distinguish remote UE, and overheads of the BAP header can be reduced. The autonomously created routing table information may be shown in Table 8.

TABLE 8

| Autonomously created routing table information |
| --- |
| Identifier of a source node |

In this case, UE 2 completes determining routing information of the first data packet. To be specific, the source node of the first data packet is UE 1, the target node of the first data packet is the network device, the previous-hop node of the first data packet is UE 2, and the next-hop node of the first data packet is the network device. Alternatively, the routing information of the first data packet is that the source node of the first data packet is UE 1.

S607: UE 2 sends the first data packet and the identifier of UE 1 to the network device. Correspondingly, the network device receives the first data packet and the identifier of UE 1.

For example, UE 2 may directly send the first data packet and a plurality of identifiers associated with the first data packet to the network device, or UE 2 may encapsulate the first data packet with a protocol header (for example, a BAP header) to obtain a new data packet, and send the new data packet to the network device. The protocol header includes the plurality of identifiers. For example, UE 2 may send a fourth data packet (an example of the new data packet) to the network device. The fourth data packet may be obtained by UE 2 by encapsulating the first data packet with a third protocol header. Correspondingly, the network device receives the fourth data packet. The third protocol header may include the identifier of UE 1. The third protocol header belongs to a first protocol layer. For example, the first protocol layer may be a BAP layer. Correspondingly, the third protocol header is a third BAP header.

In an example, there may be one or more logical channels between UE and the network device for carrying a data packet and a plurality of identifiers associated with the data packet. For example, UE 2 may send the first data packet and the identifier of UE 1 to the network device through a third logical channel. Alternatively, UE 2 may send the fourth data packet to the network device through a third logical channel. An example in which UE 2 sends the fourth data packet to the network device through the third logical channel is used below for description.

For example, UE 2 may directly select the third logical channel from one or more logical channels existing between UE 2 and the network device, to carry the fourth data packet. Alternatively, UE 2 may select, based on fourth information associated with the first data packet, the third logical channel from one or more logical channels existing between UE 2 and the network device, to carry the fourth data packet. The fourth information related to the first data packet may include at least one of the following information: the identifier of the source node, the identifier of the target node, the identifier of the previous-hop node, the identifier of the next-hop node, the data type, the QoS information, the identifier of the DRB, or the identifier of the logical channel.

For example, UE 2 may map data packets for different target nodes (or source nodes, or previous-hop nodes, or next-hop nodes) to different logical channels, and UE 2 may determine the third logical channel based on the target node (or the source node, or the previous-hop node, or the next-hop node) of the first data packet. For example, if the target node of the first data packet is node 1, UE 2 may determine that a logical channel corresponding to node 1 is the third logical channel. For example, if the source node of the first data packet is node 2, UE 2 may determine that a logical channel corresponding to node 2 is the third logical channel. For another example, if the next-hop node of the first data packet is node 3, UE 2 may determine that a logical channel corresponding to node 3 is the third logical channel.

It should be noted that, for a specific implementation in which UE 2 determines, based on other fourth information, the logical channel for carrying the first data packet, refer to the specific implementation in which UE 1 determines the logical channel for carrying the first data packet in step S605, and details are not described herein again.

In the foregoing embodiment, UE 2 serving as relay UE may flexibly determine, based on the data type, the port information, the QoS information, or the like, the logical channel for carrying the first data packet. For example, UE 2 may determine, based on the QoS information, the logical channel for carrying the first data packet, to ensure quality of service. For another example, UE 2 may determine, based on the port information, the logical channel for carrying the first data packet, to ensure that UE 2 can successfully forward the first data packet to the determined next-hop node.

In a possible implementation, UE 2 may report an identifier of a child node of UE 2 to the network device, so that the network device configures downlink routing table information for UE 2. For example, the identifier of the child node of UE 2 is carried in RRC signaling, or the identifier of the child node of UE 2 is carried in a BAP header. The identifier of the child node of UE 2 may be used by the network device to configure downlink routing information for UE 2. For example, in a process in which UE 2 establishes an RRC connection to the network device, UE 2 may report the identifier of the child node of UE 2 to the network device.

S608: The network device obtains the first data packet.

For example, the network device may receive the first data packet and the identifier of UE 1 from UE 2, to obtain the first data packet. Alternatively, the network device may receive the fourth data packet from UE 2. Further, the network device decapsulates the fourth data packet to obtain the first data packet and the third BAP header. The third BAP header includes the identifier of UE 1. Then, the network device may perform corresponding subsequent processing based on the second message included in the first data packet, or the first data included in the first data packet, or the default information included in the first data packet. For example, if the second message is an RRC connection setup request message, the network device may send an RRC connection setup response message to UE 1.

In this case, the first data packet is successfully transmitted from UE 1 to the network device through UE 2.

Embodiment 2

In this embodiment, the communication system 200 shown in FIG. 2 is used as an example to describe an uplink routing process in which first UE determines that a next-hop node of a first data packet is first relay UE, and sends the first data packet to a network device through the first relay UE and second relay UE. The first UE may be UE 1 shown in FIG. 2, the first relay UE may be UE 3 shown in FIG. 2, the second relay UE may be UE 2 shown in FIG. 2, and the network device may be the network device shown in FIG. 2. Referring to a schematic flowchart of a routing method shown in FIGS. 8, S801 to S803 and S808 to S810 are respectively the same as S601 to S603 and S606 to S608 in the embodiment shown in FIG. 6. A difference lies in the following.

S804: UE 1 determines that a next-hop node of the first data packet is UE 3.

For example, UE 1 may determine, based on first information associated with the first data packet, that the next-hop node of the first data packet is UE 3.

S805: UE 1 sends the first data packet, an identifier of UE 1, an identifier of the network device, and an identifier of UE 3 to UE 3. Correspondingly, UE 3 receives the first data packet, the identifier of UE 1, the identifier of the network device, and the identifier of UE 3.

In an example, UE 1 may directly send the first data packet, the identifier of UE 1, the identifier of the network device, and the identifier of UE 3 to UE 3. Alternatively, UE 1 may send a second data packet to UE 3, where the second data packet may be obtained by UE 1 by encapsulating the first data packet with a first BAP header, and the first BAP header may include the identifier of UE 1, the identifier of the network device, and the identifier of UE 3.

In another example, UE 1 may determine a first logical channel, and send the first data packet, the identifier of UE 1, the identifier of the network device, and the identifier of UE 3 to UE 3 through the first logical channel. Alternatively, UE 1 may determine a first logical channel, and send the second data packet to UE 3 through the first logical channel.

For example, UE 1 may determine the first logical channel based on second information associated with the first data packet.

Figure 6:
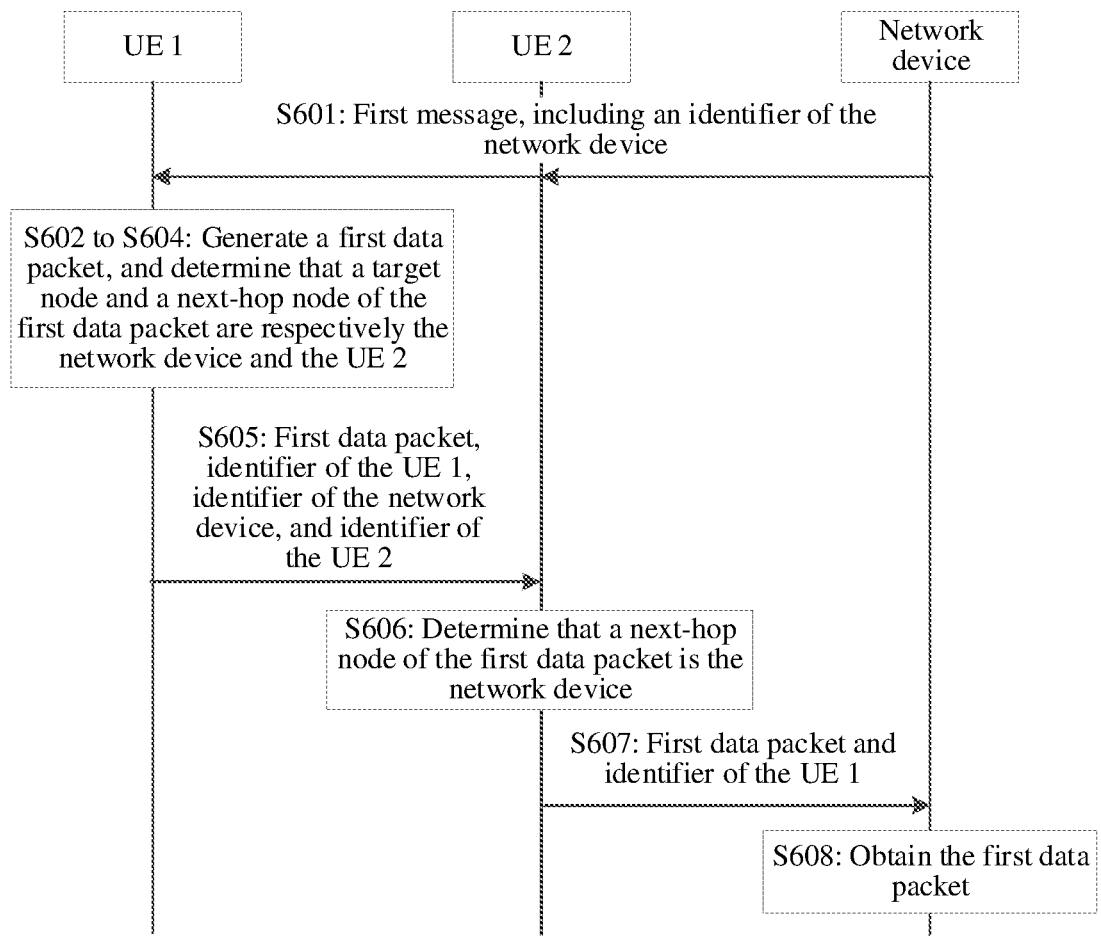
FIG. 6 is a schematic flowchart of a routing method according to an embodiment of this application.

For specific implementation processes of S804 and S805, refer to S604 and S605 in the embodiment shown in FIG. 6. Details are not described herein again.

S806: UE 3 determines that a next-hop node of the first data packet is UE 2.

In an example, UE 3 may receive the first data packet, the identifier of UE 1, the identifier of the network device, and the identifier of UE 3 from UE 1. Alternatively, UE 3 may receive the second data packet from UE 1. Further, UE 3 decapsulates the second data packet to obtain the first data packet and the first BAP header. The first BAP header includes the identifier of UE 1, the identifier of the network device, and the identifier of UE 3. Then, UE 3 may determine that the next-hop node of the first data packet is UE 2.

In an example, UE 3 may autonomously create routing table information, to determine a next-hop node of a to-be-sent data packet, as shown in Table 1. For example, UE 3 may determine, based on the first message or system pre-definition, that the target node of the first data packet is the network device. For example, UE 3 may determine, based on the first BAP header, that the source node of the first data packet is UE 1. For another example, because the target node of the first data packet is not UE 3, and UE 2 needs to forward the first data packet, UE 3 may determine that the previous-hop node of the first data packet is UE 3.

In an example, UE 3 establishes an SL connection to one or more relay UEs, and UE 3 may directly select one relay UE from the one or more relay UEs as the next-hop node of the first data packet; or UE 3 may determine the next-hop node of the first data packet based on third information associated with the first data packet. The third information associated with the first data packet may include at least one of the following information: an identifier of the source node, an identifier of the target node, an identifier of a previous-hop node, a data type, a message type, an identifier of a DRB, an identifier of a logical channel, or QoS information.

For example, UE 3 may send data packets for different source nodes (or target nodes, or previous-hop nodes) to different nodes, and UE 3 may determine the next-hop node of the first data packet based on the source node (or the target node, or the previous-hop node) of the first data packet. For example, if the source node of the first data packet is node 1, UE 3 may determine that a next-hop node corresponding to node 1 is the next-hop node of the first data packet. For example, if the target node of the first data packet is node 2, UE 3 may determine that a next-hop node corresponding to node 2 is the next-hop node of the first data packet. For another example, if the previous-hop node of the first data packet is node 3, UE 3 may determine that a next-hop node corresponding to node 3 is the next-hop node of the first data packet.

For example, UE 3 may send data packets for different DRBs (or logical channels) to different nodes, and UE 3 may determine the next-hop node of the first data packet based on identifiers of the DRBs (or identifiers of the logical channels). For example, if DRB 1 carries the first data packet, UE 3 may determine that a next-hop node corresponding to DRB 1 is the next-hop node of the first data packet. For example, if logical channel 1 carries the first data packet, UE 3 may determine that a next-hop node corresponding to logical channel 1 is the next-hop node of the first data packet.

It should be noted that for a specific implementation in which UE 3 determines the next-hop node of the first data packet based on other third information, refer to the specific implementation in which UE 1 determines the next-hop node of the first data packet in step S604. Details are not described herein again.

In the foregoing embodiment, UE 3 serving as relay UE may flexibly determine the next-hop node of the first data packet based on the data type, the port information, the QoS information, or the like. For example, UE 3 may determine the next-hop node of the first data packet based on the QoS information, to ensure quality of service. For another example, UE 3 may determine the next-hop node of the first data packet based on the port information, to ensure that UE 3 can successfully forward the first data packet to the determined next-hop node.

In this case, UE 3 completes determining routing information of the first data packet. To be specific, the source node of the first data packet is UE 1, the target node of the first data packet is the network device, the previous-hop node of the first data packet is UE 3, and the next-hop node of the first data packet is UE 2.

S807: UE 3 sends the first data packet, the identifier of UE 1, the identifier of the network device, the identifier of UE 3, and an identifier of UE 2 to UE 2. Correspondingly, UE 2 receives the first data packet, the identifier of UE 1, the identifier of the network device, the identifier of UE 3, and the identifier of UE 2.

In an example, UE 3 may directly send the first data packet, the identifier of UE 1, the identifier of the network device, the identifier of UE 3, and the identifier of UE 2 to UE 2. Alternatively, UE 3 may send a third data packet to UE 2, and the third data packet may be obtained by UE 3 by encapsulating the first data packet with a second protocol header. The second protocol header may include the identifier of UE 1, the identifier of the network device, the identifier of UE 3, and the identifier of UE 2. Correspondingly, UE 2 receives the third data packet, and then UE 2 may decapsulate the third data packet, to obtain the first data packet and the second protocol header.

In another example, UE 3 may send the first data packet, the identifier of UE 1, the identifier of the network device, the identifier of UE 3, and the identifier of UE 2 to UE 2 through a second logical channel. Alternatively, UE 3 may send the third data packet to UE 2 through a second logical channel. For example, UE 3 may determine the second logical channel based on fourth information associated with the first data packet. For a specific implementation in which UE 3 determines the second logical channel, refer to content in S607 in the foregoing embodiment. Details are not described herein again.

Figure 8:
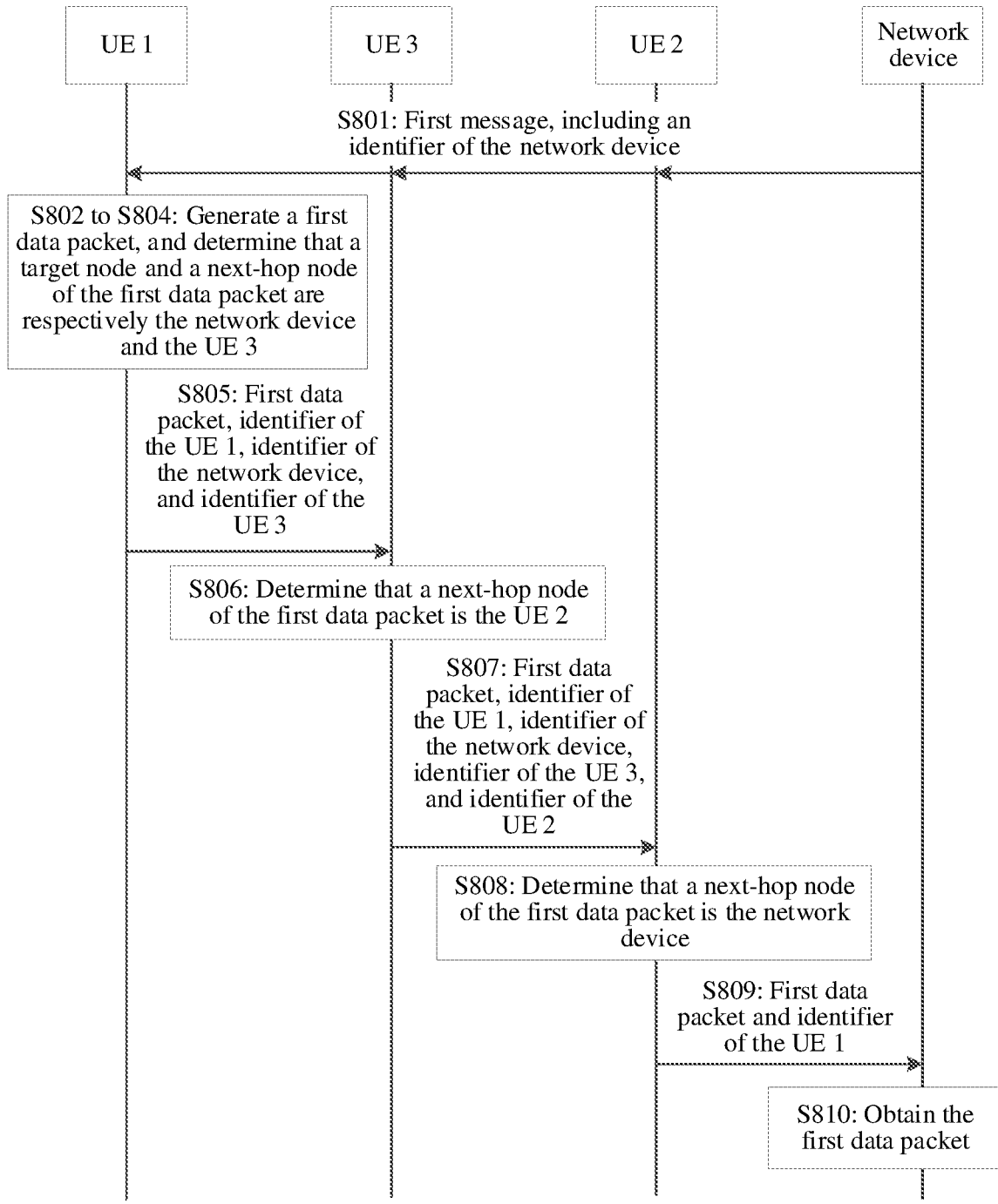
FIG. 8 is another schematic flowchart of a routing method according to an embodiment of this application.

In the embodiment shown in FIG. 8, UE 3 serves as tail relay UE in a multi-hop communication scenario, and may autonomously determine the next-hop node of the first data packet. For example, UE 3 may determine the next-hop node of the first data packet based on UE that establishes an SL to UE 3, or determine the next-hop node of the first data packet based on the third information (such as the data type, the QoS information, or the port information) associated with the first data packet. In this way, after receiving an uplink data packet, UE 3 may independently determine a next-hop node of the uplink data packet, and forward the uplink data packet to a determined next-hop node, thereby completing routing of the first data packet between UE 3 and the next-hop node of UE 3.

Further, UE 3 may determine the second logical channel. For example, UE 3 may flexibly determine the second logical channel based on the fourth information (for example, the logical channel identifier, the QoS information, or the data type) associated with the first data packet, to ensure that UE 3 can send the first data packet to the next-hop node, to complete data forwarding from UE 3 to the next-hop node of UE 3.

Embodiment 3

In this embodiment, the communication system 300 shown in FIG. 3 is used as an example to describe an uplink routing process in which first UE determines that a next-hop node of a first data packet is first relay UE, and sends the first data packet to a network device through the first relay UE, second relay UE, and third relay UE. The first UE may be UE 1 shown in FIG. 3, the first relay UE may be UE 3 shown in FIG. 3, the second relay UE may be UE 2 shown in FIG. 3, the third relay UE may be UE 4 shown in FIG. 3, and the network device may be the network device shown in FIG. 3. Referring to a schematic flowchart of a routing method shown in FIGS. 9, S901 to S905 and S910 to S912 are respectively the same as S801 to S805 and S808 to S810 in the embodiment shown in FIG. 8. A difference lies in the following.

S906: UE 3 determines that a next-hop node of the first data packet is UE 4.

For example, UE 3 may determine, based on third information associated with the first data packet, that the next-hop node of the first data packet is UE 4.

S907: UE 3 sends the first data packet, the identifier of UE 1, the identifier of the network device, the identifier of UE 3, and an identifier of UE 4 to UE 4. Correspondingly, UE 4 receives the first data packet, the identifier of UE 1, the identifier of the network device, the identifier of UE 3, and the identifier of UE 4.

In an example, UE 3 may directly send the first data packet, the identifier of UE 1, the identifier of the network device, the identifier of UE 3, and the identifier of UE 4 to UE 4. Alternatively, UE 3 may send a seventh data packet to UE 4, and the seventh data packet may be obtained by UE 3 by encapsulating the first data packet with a fifth protocol header. The fifth protocol header may include the identifier of UE 1, the identifier of the network device, the identifier of UE 3, and the identifier of UE 4. For example, the fifth protocol header belongs to a first protocol layer, for example, a fifth BAP header.

In another example, UE 3 may determine a fifth logical channel, and send the first data packet, the identifier of UE 1, the identifier of the network device, the identifier of UE 3, and the identifier of UE 4 to UE 4 through the fifth logical channel. Alternatively, UE 3 may determine a fifth logical channel, and send the seventh data packet to UE 4 through the fifth logical channel.

S908: UE 4 determines that a next-hop node of the first data packet is UE 2.

For example, UE 4 may determine, based on third information associated with the first data packet, that the next-hop node of the first data packet is UE 2.

S909: UE 4 sends the first data packet, the identifier of UE 1, the identifier of the network device, the identifier of UE 4, and an identifier of UE 2 to UE 2. Correspondingly, UE 2 receives the first data packet, the identifier of UE 1, the identifier of the network device, the identifier of UE 4, and the identifier of UE 2.

In an example, UE 4 may directly send the first data packet, the identifier of UE 1, the identifier of the network device, the identifier of UE 4, and the identifier of UE 2 to UE 2. Alternatively, UE 4 may send an eighth data packet to UE 2, where the eighth data packet may be obtained by UE 4 by encapsulating the first data packet with a sixth protocol header. The sixth protocol header may include the identifier of UE 1, the identifier of the network device, the identifier of UE 4, and the identifier of UE 2. For example, the sixth protocol header belongs to a first protocol layer, for example, a fifth BAP header.

In another example, UE 4 may determine a sixth logical channel, and send the first data packet, the identifier of UE 1, the identifier of the network device, the identifier of UE 4, and the identifier of UE 2 to UE 2 through the sixth logical channel. Alternatively, UE 4 may determine a sixth logical channel, and send an eighth data packet to UE 2 through the sixth logical channel.

For a specific implementation of S906 and S908, refer to the content described in S806. For a specific implementation of S907 and S909, refer to the content described in S807. Details are not described herein again.

Figure 9:
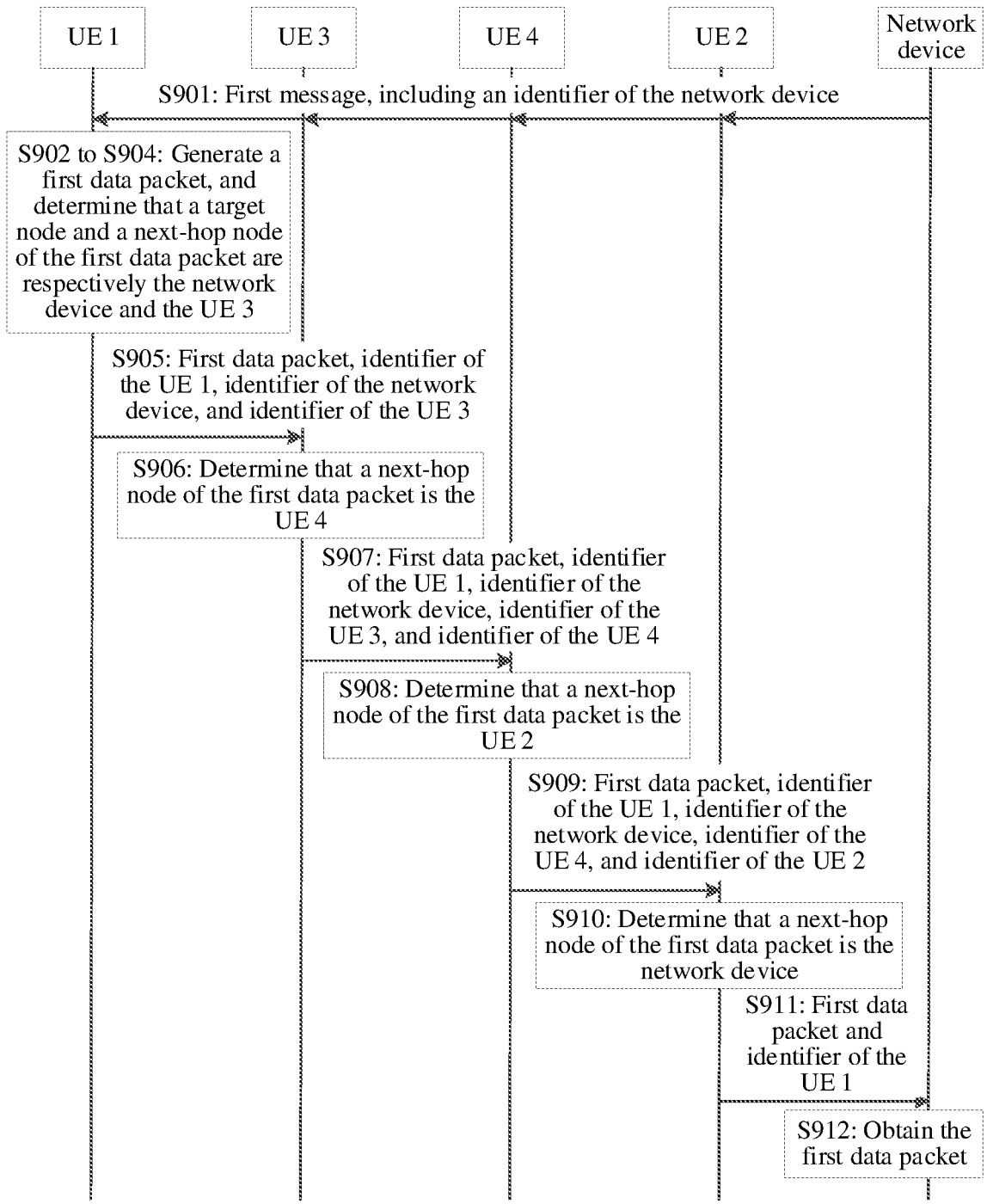
FIG. 9 is another schematic flowchart of a routing method according to an embodiment of this application.

In the embodiment shown in FIG. 9, UE 4 serves as common relay UE in a multi-hop communication scenario, and may autonomously determine the next-hop node of the first data packet. For example, UE 4 may determine the next-hop node of the first data packet based on UE that establishes an SL to UE 4, or determine the next-hop node of the first data packet based on the third information (such as the data type, the QoS information, or the port information) associated with the first data packet. In this way, UE 4 may forward the first data packet to the determined next-hop node, thereby completing routing of the first data packet between UE 4 and UE 2. Further, UE 4 may determine the sixth logical channel, so that UE 4 can successfully send the first data packet to the next-hop node.

Figure 10:
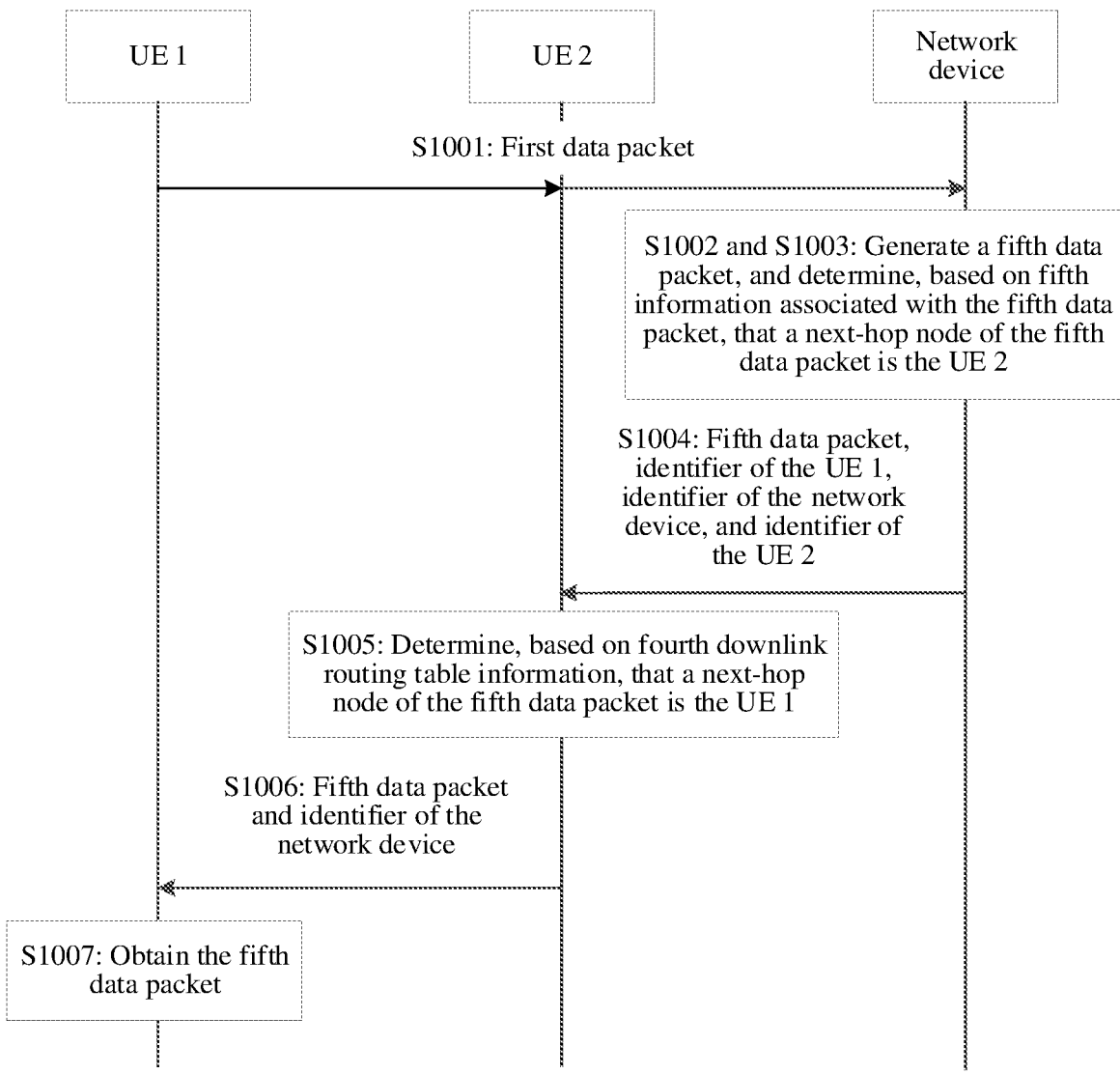
FIG. 10 is another schematic flowchart of a routing method according to an embodiment of this application.
Figure 11:
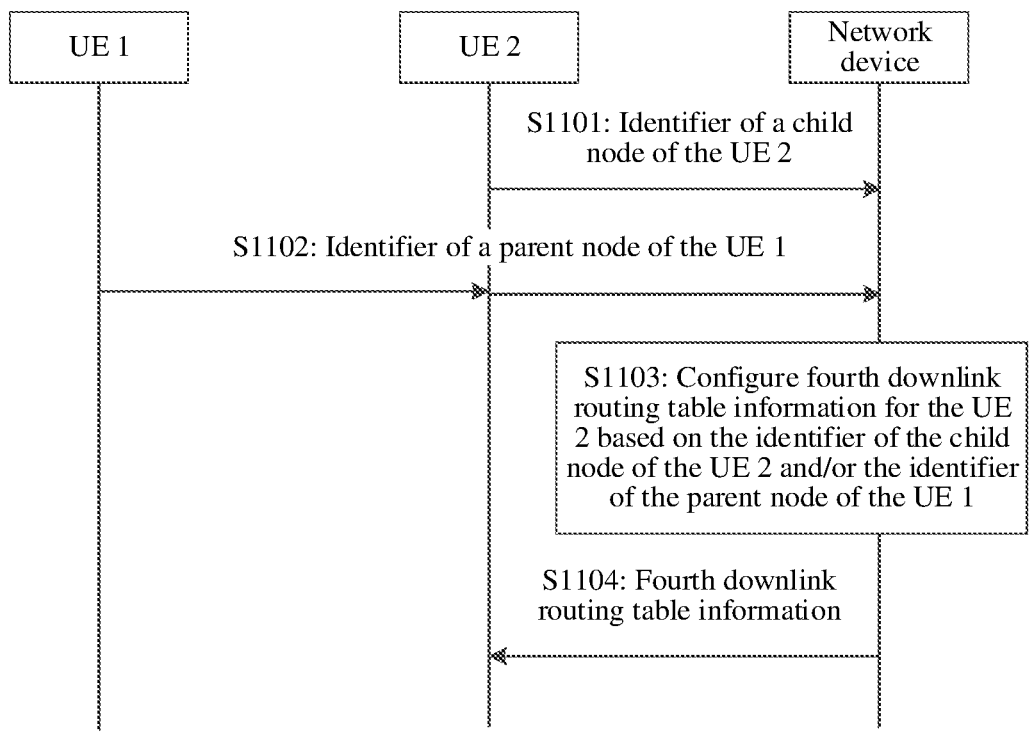
FIG. 11 is a schematic flowchart of a downlink routing table information configuration method according to an embodiment of this application.

The foregoing describes an uplink routing method provided in embodiments of this application with reference to FIG. 6 to FIG. 9, and the following describes a downlink routing method provided in embodiments of this application with reference to FIG. 10 to FIG. 11.

Embodiment 4

In this embodiment, the communication system 100 shown in FIG. 1 is used as an example to describe a downlink routing process in which a network device determines that a next-hop node of a fifth data packet is second relay UE, and sends the fifth data packet to first UE through the second relay UE. The first UE may be UE 1 shown in FIG. 1, the second relay UE may be UE 2 shown in FIG. 1, and the network device may be the network device shown in FIG. 1. A method in this embodiment is described in detail with reference to a schematic flowchart of a routing method shown in FIG. 10.

S1001: The first UE sends a first data packet. Correspondingly, the network device receives the first data packet through UE 2.

For example, the first UE may generate the first data packet, and send the first data packet to the network device through UE 2. For a specific implementation process, refer to content in the foregoing Embodiment 1, and details are not described herein again.

S1002: The network device generates the fifth data packet.

For example, the fifth data packet may include a third message, or include second data, or include a third message and second data, or include default information. This is not limited in this embodiment of this application.

The third message may be RRC signaling, for example, an RRC connection setup response (RRC setup response) message or an RRC connection reestablishment response (RRC reestablishment response) message. Optionally, the third message may alternatively be non-access stratum (NAS) signaling.

In an example, the network device may generate the fifth data packet based on the first data packet. For example, if a second message is an RRC connection setup request message, and the network device needs to send an RRC connection setup response message to UE 1, the network device may generate the fifth data packet based on the RRC connection setup response message.

In another example, step S1001 may be an optional step. For example, the network device may directly generate the fifth data packet. For example, the network device may generate the fifth data packet based on data and/or a message actively pushed to UE 1.

S1003: The network device determines, based on fifth information associated with the fifth data packet, that a next-hop node of the fifth data packet is UE 2.

For example, the fifth information associated with the fifth data packet may include at least one of the following information: a data type, a message type, port information, QoS information, or the like. Optionally, when the network device is a DU and a CU, the CU may construct an association relationship between a C-RNTI of a source node and an L2 ID of the source node based on a source node of the fifth data packet, generate routing table information based on the association relationship, and send the routing table information to the DU. Then, the DU may determine the next-hop node of the fifth data packet based on the routing table information configured by the CU.

For a specific implementation in which the network device determines the next-hop node of the fifth data packet, refer to the specific implementation in which UE 1 determines the next-hop node of the first data packet in S604. Details are not described herein again.

S1004: The network device sends the fifth data packet, an identifier of the network device, an identifier of UE 1, and an identifier of UE 2 to UE 2. Correspondingly, UE 2 receives the fifth data packet, the identifier of the network device, the identifier of UE 1, and the identifier of UE 2.

For example, the network device may directly send the fifth data packet, the identifier of UE 1, the identifier of the network device, and the identifier of UE 2 to UE 2. Alternatively, the network device may send a sixth data packet (an example of a new data packet) to UE 2, where the sixth data packet is obtained by the network device by encapsulating the fifth data packet with a fourth protocol header. Correspondingly, UE 2 receives the sixth data packet. The fourth protocol header may include the identifier of UE 1, the identifier of the network device, and the identifier of UE 2. The fourth protocol header belongs to a first protocol layer, for example, the fourth protocol header is a fourth BAP header.

In an example, the network device may determine a fourth logical channel, and send the fifth data packet, the identifier of UE 1, the identifier of the network device, and the identifier of UE 2 to UE 2 through the fourth logical channel. Alternatively, the network device may determine a fourth logical channel, and send the sixth data packet to UE 2 through the fourth logical channel.

For a specific implementation in which the network device determines the fourth logical channel, refer to the specific implementation in which UE 1 determines the first logical channel in S605. Details are not described herein again.

S1005: UE 2 determines, based on a fourth downlink routing table information, that a next-hop node of the fifth data packet is UE 1.

For example, UE 2 may determine, based on the fourth downlink routing table information, that the next-hop node of the fifth data packet is UE 1. The fourth downlink routing table information may be configured by the network device. As shown in Table 9, UE 2 establishes an SL connection to each of UE 1, UE 3, and UE 4. When a source node is the network device, a target node is UE 1, and a previous-hop node is the network device, UE 2 may determine that the next-hop node is UE 1. When a source node is the network device, a target node is UE 5, and a previous-hop node is UE 6, UE 2 may determine that the next-hop node is UE 3. When a source node is the network device, a target node is UE 5, and a previous-hop node is UE 7, UE 2 may determine that the next-hop node is UE 4. It may be understood that each piece of data in Table 9 is merely an example, and this embodiment of this application is not limited thereto.

TABLE 9

Fourth downlink routing table information

| Source node | Target node | Previous-hop node | Next-hop node |
| --- | --- | --- | --- |
| Network device | UE 1 | Network device | UE 1 |
| Network device | UE 5 | UE 6 | UE 3 |
| Network device | UE 5 | UE 7 | UE 4 |

An embodiment of this application further provides a downlink routing table configuration method. In the method, a network device may configure downlink routing table information for UE based on an identifier of a child node that is reported by the UE. Alternatively, a network device may configure downlink routing table information for UE based on an identifier of a parent node that is reported by a child node of the UE. Alternatively, a network device may configure downlink routing table information for UE based on an identifier of a child node that is reported by the UE and an identifier of a parent node that is reported by the child node of the UE.

Refer to FIG. 11. FIG. 11 is a schematic flowchart of a downlink routing table information configuration method according to an embodiment of this application that is described by using the communication system 100 shown in FIG. 1 as an example. First UE may be UE 1 shown in FIG. 1, second relay UE may be UE 2 shown in FIG. 1, and a network device may be the network device shown in FIG. 1.

S1101: UE 2 sends an identifier of a child node of UE 2 to the network device. Correspondingly, the network device receives the identifier of the child node of UE 2.

For example, in a process in which UE 2 establishes an RRC connection to the network device, UE 2 may send the identifier of the child node of UE 2 to the network device. For example, the identifier is carried in RRC signaling or a BAP header. For example, an SL connection is established between UE 2 and each of UE 3 and UE 4, and data (or messages) of UE 3 and UE 4 are forwarded to the network device through UE 2. In this case, UE 2 may send an identifier of UE 3 and an identifier of UE 4 to the network device.

Optionally, the child node of UE 2 may include UE 1. For example, if the child node reported by UE 2 includes UE 1, the network device may perform content shown in S1103. On the contrary, the network device may perform content shown in S1102. That is, S1102 is an optional step.

S1102: UE 1 sends an identifier of a parent node of UE 1 to the network device. Correspondingly, the network device receives the identifier of the parent node of UE 1.

The parent node of UE 1 includes UE 2. For example, UE 1 may report the identifier of the parent node of UE 1 to the network device through UE 2 in the routing manner shown in FIG. 6. For example, UE 1 may send the identifier of the parent node of UE 1 to the network device in a process of establishing an RRC connection to the network device. For example, the identifier is carried in RRC signaling or a BAP header.

S1103: The network device configures fourth downlink routing table information for UE 2 based on the identifier of the child node of UE 2 and/or the identifier of the parent node of UE 1.

For example, the network device may determine a network topology relationship of UE 2 based on the identifier of the child node of UE 2, or based on the identifier of the parent node of UE 1, or based on the identifier of the child node of UE 2 and the identifier of the parent node of UE 1, and configure the fourth downlink routing table information for UE 2 based on the network topology relationship of UE 2, where the fourth downlink routing table information may be used to determine a downlink route of UE 2.

S1104: The network device sends the fourth downlink routing table information to UE 2. Correspondingly, UE 2 receives the fourth downlink routing table information.

In this case, the network device completes configuration of the fourth downlink routing table information.

In the embodiment shown in FIG. 11, the network device may determine a network topology relationship of a parent node of each UE (for example, terminal UE or relay UE) by obtaining an identifier of a parent node of the UE, and then configure downlink routing table information for the parent node of the UE based on the network topology relationship, to implement a downlink route of the parent node of the UE. Alternatively, the network device may determine a network topology relationship of each UE (for example, relay UE) by obtaining an identifier of a child node of the UE, and then configure downlink routing table information for the UE based on the network device relationship, to implement a downlink route of the UE.

It may be understood that content shown in FIG. 11 that is performed after step S1005 is merely an example, and this is not limited in this embodiment of this application. For example, the network device may perform the content shown in FIG. 11 after step S1005, or may perform the content shown in FIG. 11 before step S1005.

S1006: UE 2 sends a fifth data packet and an identifier of the network device to UE 1. Correspondingly, UE 1 receives the fifth data packet and the identifier of the network device.

For a specific implementation of step S1006, refer to the content shown in the foregoing step S1004, and details are not described herein again.

S1007: UE 1 obtains the fifth data packet.

For a specific implementation of step S1007, refer to the content shown in the foregoing step S608, and details are not described herein again.

In this case, the fifth data packet is successfully transmitted from the network device to UE 1 through UE 2.

It may be understood that the network device may configure downlink routing table information for each UE according to the procedure shown in FIG. 11. FIG. 3 is used as an example. When UE 1 has a child node, UE 1 may send an identifier of the child node of UE 1 to the network device through UE 2, UE 3, and UE 4. The network device may configure first downlink routing table information for UE 1 according to the procedure shown in FIG. 11. For example, UE 3 may report an identifier of a child node of UE 3 to the network device through UE 4 and UE 2, and the network device may configure second downlink routing table information for UE 3 according to the procedure shown in FIG. 11. For another example, UE 4 may report an identifier of a child node of UE 4 to the network device through UE 2, and the network device may configure third downlink routing table information for UE 4 according to the procedure shown in FIG. 11. In this way, each relay UE may implement a downlink route between the network device and remote UE based on downlink routing table information configured by the network device.

The communication system shown in FIG. 2 is used as an example. The network device may send the fifth data packet to UE 2. After receiving the fifth data packet, UE 2 may determine, based on the fourth downlink routing table information, that a next-hop node of the fifth data packet is UE 3, and forward the fifth data packet to UE 3. After receiving the fifth data packet, UE 3 may determine, based on the second downlink routing table information, that a next-hop node of the fifth data packet is UE 1, and forward the fifth data packet to UE 1. UE 1 receives the fifth data packet.

The communication system shown in FIG. 3 is used as an example. The network device may send the fifth data packet to UE 2. After receiving the fifth data packet, UE 2 may determine, based on the fourth downlink routing table information, that a next-hop node of the fifth data packet is UE 4, and forward the fifth data packet to UE 4. After receiving the fifth data packet, UE 4 may determine, based on the third downlink routing table information, that a next-hop node of the fifth data packet is UE 3, and forward the fifth data packet to UE 3. After receiving the fifth data packet, UE 3 may determine, based on the second downlink routing table information, that a next-hop node of the fifth data packet is UE 1, and forward the fifth data packet to UE 1. UE 1 receives the fifth data packet.

In the embodiment shown in FIG. 10, the network device may configure downlink routing table information for relay UE (for example, UE 2), so that the relay UE may determine a next-hop node of a data packet based on the downlink routing table information, to complete routing between the relay UE and the next-hop node. In this way, the data packet is sent from the network device to remote UE, so that a downlink route between the network device and the remote UE can be implemented.

Figure 12:
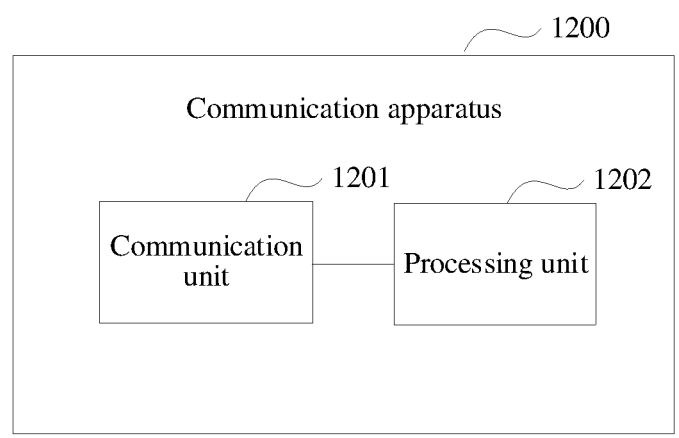
FIG. 12 is a schematic diagram of a structure of a communication apparatus according to an embodiment of this application.

Based on a same technical concept, this application further provides a communication apparatus. A structure of the apparatus is shown in FIG. 12, and includes a communication unit 1201 and a processing unit 1202. The communication apparatus 1200 may be applied to the communication system shown in FIG. 1, FIG. 2, or FIG. 3, and may implement the routing method provided in the foregoing embodiments. Optionally, a physical representation form of the communication apparatus 1200 may be a communication device, for example, a network device or UE. Alternatively, the communication apparatus may be another apparatus that can implement a function of a communication device, for example, a processor or a chip inside the communication device. Specifically, the communication apparatus 1200 may be some programmable chips such as a field-programmable gate array (FPGA), a complex programmable logic device (CPLD), an application-specific integrated circuit (ASIC), or a system on a chip (SOC).

Functions of units in the apparatus 1200 are described below.

The communication unit 1201 is configured to receive and send data. Optionally, the communication unit 1201 may be implemented by using a transceiver, for example, a mobile communication module.

The mobile communication module may provide a solution for wireless communication, including 2G/3G/4G/5G and the like, that is applied to the UE. The mobile communication module may include at least one antenna, at least one filter, a switch, a power amplifier, a low noise amplifier (LNA), and the like. The communication device may interact with another device in the communication system by using the mobile communication module.

Optionally, the communication apparatus 1200 may be used in first UE (that is, UE 1), or used in first relay UE (that is, UE 3), or used in second relay UE (that is, UE 2), or used in third relay UE (that is, UE 4), or used in a network device.

For example, the communication apparatus 1200 is used in UE 1. The processing unit 1202 is configured to determine that a target node of a first data packet is a network device; and determine that a next-hop node of the first data packet is a first relay terminal device, where there is an SL connection between a first terminal device and the first relay terminal device. The communication unit 1201 is configured to send the first data packet, an identifier of the first terminal device, an identifier of the network device, and an identifier of the first relay terminal device to the first relay terminal device.

In a possible design, when sending the first data packet, the identifier of the first terminal device, the identifier of the network device, and the identifier of the first relay terminal device to the first relay terminal device, the communication unit 1201 is configured to send a second data packet to the first relay terminal device, where the second data packet is obtained by encapsulating the first data packet with a first protocol header, and the first protocol header includes the identifier of the first terminal device, the identifier of the network device, and the identifier of the first relay terminal device.

In a possible design, the processing unit 1202 is configured to determine, based on first information associated with the first data packet, that the next-hop node of the first data packet is the first relay terminal device, where the first information includes at least one of the following information: a data type, a message type, port information, or quality of service (QOS) information.

In a possible design, the processing unit 1202 is configured to determine a first logical channel based on second information associated with the first data packet, where the second information includes at least one of the following information: the data type, the message type, the port information, the QoS information, or an identifier of a first data radio bearer (DRB). When sending the first data packet, the identifier of the first terminal device, the identifier of the network device, and the identifier of the first relay terminal device to the first relay terminal device, the communication unit 1201 is configured to send the first data packet, the identifier of the first terminal device, the identifier of the network device, and the identifier of the first relay terminal device to the first relay terminal device through the first logical channel.

In a possible design, the first protocol header or the first data packet may include an identifier of a previous-hop node of the first terminal device, the identifier of the previous-hop node of the first terminal device is for determining first downlink routing table information, and the first downlink routing table information indicates a downlink route of the first terminal device.

In a possible design, the communication unit 1201 is configured to receive a first message, where the first message includes the identifier of the network device.

In a possible design, the processing unit 1202 is configured to generate the first data packet.

For example, the communication apparatus 1200 is used in UE 3. The communication unit 1201 is configured to receive a first data packet, an identifier of a first terminal device, an identifier of a network device, and an identifier of a first relay terminal device from the first terminal device, where the first terminal device is a source node of the first data packet, and the network device is a target node of the first data packet. The processing unit 1202 is configured to determine that a next-hop node of the first data packet is a second relay terminal device, where there is a sidelink (SL) connection between the first relay terminal device and the second relay terminal device. The communication unit 1201 is configured to send the first data packet, the identifier of the first terminal device, the identifier of the network device, the identifier of the first relay terminal device, and an identifier of the second relay terminal device to the second relay terminal device.

In a possible design, when receiving the first data packet, the identifier of the first terminal device, the identifier of the network device, and the identifier of the first relay terminal device from the first terminal device, the communication unit 1201 is configured to receive a second data packet from the first terminal device; and decapsulate the second data packet to obtain the first data packet and a first protocol header, where the first protocol header includes the identifier of the first terminal device, the identifier of the network device, and the identifier of the first relay terminal device.

In a possible design, when sending the first data packet, the identifier of the first terminal device, the identifier of the network device, the identifier of the first relay terminal device, and the identifier of the second relay terminal device to the second relay terminal device, the communication unit 1201 is configured to send a third data packet to the second relay terminal device, where the third data packet is obtained by encapsulating the first data packet with a second protocol header, where the second protocol header includes the identifier of the first terminal device, the identifier of the network device, the identifier of the first relay terminal device, and the identifier of the second relay terminal device.

In a possible design, the processing unit 1202 is configured to determine, based on third information associated with the first data packet, that the next-hop node of the first data packet is the second relay terminal device, where the third information includes at least one of the following information: an identifier of the source node, an identifier of the target node, an identifier of a previous-hop node, an identifier of the next-hop node, a data type, a message type, an identifier of a first data radio bearer (DRB), or quality of service (QOS) information.

In a possible design, the processing unit 1202 is configured to determine a second logical channel based on fourth information associated with the first data packet, where the fourth information includes at least one of the following information: the identifier of the source node, the identifier of the target node, the identifier of the previous-hop node, the identifier of the next-hop node, the identifier of the first DRB, or the QoS information. When sending the first data packet, the identifier of the first terminal device, the identifier of the second relay terminal device, and the identifier of the network device to the second relay terminal device, the communication unit 1201 is configured to send the first data packet, the identifier of the first terminal device, the identifier of the second relay terminal device, and the identifier of the network device to the second relay terminal device through the second logical channel.

In a possible design, the second protocol header or the first data packet may include an identifier of a previous-hop node of the first terminal device, the identifier of the previous-hop node of the first terminal device is for determining first downlink routing table information, and the first downlink routing table information indicates a downlink route of the first terminal device.

For example, the communication apparatus 1200 is used in UE 2. The communication unit 1201 is configured to receive a first data packet, an identifier of a first terminal device, an identifier of a network device, an identifier of a first relay terminal device, and an identifier of a second relay terminal device from the first relay terminal device, where the first terminal device is a source node of the first data packet, and the network device is a target node of the first data packet. The processing unit 1202 is configured to determine that a next-hop node of the first data packet is the network device, where there is a radio resource control (RRC) connection between the second relay terminal device and the network device. The communication unit 1201 is configured to send the first data packet and the identifier of the first terminal device to the network device.

In a possible design, when receiving the first data packet, the identifier of the first terminal device, the identifier of the network device, the identifier of the first relay terminal device, and the identifier of the second relay terminal device from the first relay terminal device, the communication unit 1201 is specifically configured to receive a third data packet from the first relay terminal device. The processing unit 1202 is further configured to decapsulate the third data packet to obtain the first data packet and a second protocol header, where the second protocol header includes the identifier of the first terminal device, the identifier of the network device, the identifier of the first relay terminal device, and the identifier of the second relay terminal device.

In a possible design, when sending the first data packet and the identifier of the first terminal device to the network device, the communication unit 1201 is configured to send a fourth data packet to the network device, where the fourth data packet is obtained by encapsulating the first data packet with a third protocol header, and the third protocol header includes the identifier of the first terminal device.

In a possible design, the processing unit 1202 is configured to determine a third logical channel based on fourth information associated with the first data packet, where the fourth information includes at least one of the following information: an identifier of the source node, an identifier of the target node, an identifier of a previous-hop node, an identifier of the next-hop node, an identifier of a first data radio bearer (DRB), or quality of service (QOS) information. When sending the first data packet and the identifier of the first terminal device to the network device, the communication unit 1201 is specifically configured to send the first data packet and the identifier of the first terminal device to the network device through the third logical channel.

In a possible design, the third protocol header or the first data packet may include an identifier of a previous hop of the first terminal device, the identifier of the previous-hop node of the first terminal device is for determining first downlink routing table information, and the first downlink routing table information indicates a downlink route of the first terminal device.

For example, the communication apparatus 1200 is used in a network device. The communication unit 1201 is configured to receive a first data packet and an identifier of a first terminal device from a second relay terminal device. The processing unit 1202 is configured to determine, based on fifth information associated with a fifth data packet, that a next-hop node of the fifth data packet is the second relay terminal device, where a target node of the fifth data packet is the first terminal device, and there is a radio resource control (RRC) connection between the network device and the second relay device. The communication unit 1201 is configured to send the fifth data packet, the identifier of the first terminal device, an identifier of the network device, and an identifier of the second relay terminal device to the second relay terminal device.

In a possible design, the fifth information includes at least one of the following information: a data type, a message type, port information, or quality of service (QOS) information.

In a possible design, when receiving the first data packet and the identifier of the first terminal device from the second relay terminal device, the communication unit 1201 is specifically configured to receive a fourth data packet from the second relay terminal device; and decapsulate the fourth data packet to obtain the first data packet and a third protocol header, where the third protocol header includes the identifier of the first terminal device.

In a possible design, when sending the fifth data packet, the identifier of the first terminal device, the identifier of the network device, and the identifier of the second relay terminal device to the second relay terminal device, the communication unit 1201 is specifically configured to send a sixth data packet to the second relay terminal device, where the sixth data packet is obtained by encapsulating the fifth data packet with a fourth protocol header, and the fourth protocol header includes the identifier of the first terminal device, the identifier of the network device, and the identifier of the second relay terminal device.

In a possible design, the processing unit 1202 is configured to determine a fourth logical channel based on sixth information associated with the fifth data packet, where the sixth information includes at least one of the following information: the data type, the message type, the port information, the QoS information, or an identifier of a second data radio bearer (DRB). When sending the fifth data packet, the identifier of the first terminal device, the identifier of the network device, and the identifier of the second relay terminal device to the second relay terminal device, the communication unit 1201 is specifically configured to send the fifth data packet, the identifier of the first terminal device, the identifier of the network device, and the identifier of the second relay terminal device to the second relay terminal device through the fourth logical channel.

In a possible design, the third protocol header further includes an identifier of a previous-hop node of the first terminal device. The processing unit 1202 is further configured to determine first downlink routing table information based on the identifier of the previous-hop node of the first terminal device, where the first downlink routing table information indicates a downlink route of the first terminal device. The communication unit 1201 is further configured to send the first downlink routing table information to the first terminal device.

In a possible design, the first data packet includes an identifier of a previous-hop node of the first terminal device. The processing unit 1202 is further configured to determine first downlink routing table information based on the identifier of the previous-hop node of the first terminal device, where the first downlink routing table information indicates a downlink route of the first terminal device. The communication unit 1201 is further configured to send the first downlink routing table information to the first terminal device.

In a possible design, the communication unit 1201 is further configured to send a first message, where the first message includes the identifier of the network device.

For example, the communication apparatus 1200 is used in UE 4. The communication unit 1201 is configured to receive a first data packet, an identifier of a first terminal device, an identifier of a network device, an identifier of a first relay terminal device, and an identifier of a third relay terminal device from the first relay terminal device, where the first terminal device is a source node of the first data packet, and the network device is a target node of the first data packet. The processing unit 1202 is configured to determine that a next-hop node of the first data packet is a second relay terminal device, where there is a sidelink (SL) connection between the second relay terminal device and the third relay terminal device. The communication unit 1201 is configured to send the first data packet, the identifier of the first terminal device, the identifier of the network device, an identifier of the second relay terminal device, and the identifier of the third relay terminal device to the second relay terminal device.

In a possible design, the communication unit 1201 is configured to receive a seventh data packet from the first relay terminal device; and decapsulate the seventh data packet to obtain the first data packet and a fifth protocol header, where the fifth protocol header includes the identifier of the first terminal device, the identifier of the network device, the identifier of the first relay terminal device, and the identifier of the third relay terminal device.

In a possible design, the communication unit 1201 is configured to send an eighth data packet to the second relay terminal device, where the eighth data packet is obtained by encapsulating the first data packet with a sixth protocol header, and the sixth protocol header includes the identifier of the first terminal device, the identifier of the network device, the identifier of the second relay terminal device, and the identifier of the third relay terminal device.

In a possible design, the processing unit 1202 is configured to determine, based on third information associated with the first data packet, that the next-hop node of the first data packet is the third relay terminal device, where the third information includes at least one of the following information: an identifier of the source node, an identifier of the target node, an identifier of a previous-hop node, a data type, an identifier of a first data radio bearer (DRB), or quality of service (QoS) information.

In a possible design, the processing unit 1202 is configured to determine a sixth logical channel based on fourth information associated with the first data packet, where the fourth information includes at least one of the following information: the identifier of the source node, the identifier of the target node, the identifier of the previous-hop node, an identifier of the next-hop node, the identifier of the first DRB, or the QoS information. The sending the first data packet, the identifier of the first terminal device, the identifier of the network device, an identifier of the second relay terminal device, and the identifier of the third relay terminal device to the second relay terminal device includes: sending the first data packet, the identifier of the first terminal device, the identifier of the network device, the identifier of the second relay terminal device, and the identifier of the third relay terminal device to the second relay terminal device through the sixth logical channel.

In a possible design, the fifth protocol header or the first data packet may include an identifier of a previous-hop node of the first terminal device, the identifier of the previous-hop node of the first terminal device is for determining first downlink routing table information, and the first downlink routing table information indicates a downlink route of the first terminal device.

It should be noted that division into the modules in the foregoing embodiments of this application is an example, and is merely logical function division. In actual implementation, there may be another division manner. In addition, function units in embodiments of this application may be integrated into one processing unit, or may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Figure 13:
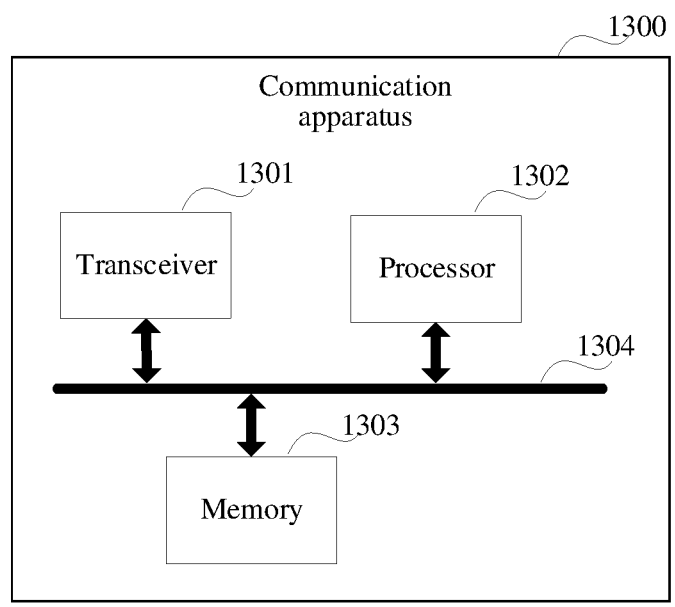
FIG. 13 is a schematic diagram of another structure of a communication apparatus according to an embodiment of this application.

Based on a same technical concept, this application further provides a communication apparatus. The communication apparatus may be used in the communication system shown in FIG. 1, FIG. 2, or FIG. 3, can implement the routing method provided in the foregoing embodiments, and has a function of the communication apparatus 1200 shown in FIG. 12. As shown in FIG. 13, the communication device 1300 includes a transceiver 1301, a processor 1302, and a memory 1303. The transceiver 1301, the processor 1302, and the memory 1303 are connected to each other.

Optionally, the transceiver 1301, the processor 1302, and the memory 1303 are connected to each other by using a bus 1304. The bus 1304 may be a peripheral component interconnect (PCI) bus, an extended industry standard architecture (EISA) bus, or the like. The bus may be classified into an address bus, a data bus, a control bus, or the like. For ease of representation, only one bold line is used for representation in FIG. 13, but this does not mean that there is only one bus or only one type of bus.

The transceiver 1301 is configured to receive and send data, to implement communication and interaction with another device.

The processor 1302 is configured to implement a function implemented by UE 1, UE 2, UE 3, UE 4, or a network device in the foregoing embodiments. For example, when the communication apparatus 1300 is used in UE 1, the processor 1302 may determine that a target node of a first data packet is a network device, and a next-hop node of the first data packet is UE 3. For example, when the communication apparatus 1300 is used in UE 2, the processor 1302 may determine that a next-hop node of a first data packet is a network device. For example, when the communication apparatus 1300 is used in UE 3, the processor 1302 may determine that a next-hop node of a first data packet is UE 4. For another example, when the communication apparatus 1300 is used in UE 4, the processor 1302 may determine that a next-hop node of a first data packet is UE 2.

It should be noted that a specific function of the processor 1302 is not described in detail in this embodiment. For the specific function of the processor 1302, refer to the description in the routing method provided in the foregoing embodiments and examples, and the specific function description of the communication apparatus 1300 in the embodiment shown in FIG. 13. Details are not described herein again.

The memory 1303 is configured to store program instructions, data, and the like. Specifically, the program instructions may include program code, and the program code includes computer operation instructions. The memory 1303 may include a random access memory (RAM), and may further include a non-volatile memory, for example, at least one magnetic disk memory. The processor 1302 executes the program instructions stored in the memory 1303, and uses the data stored in the memory 1303, to implement the foregoing function, so as to implement the routing method provided in the foregoing embodiments.

It may be understood that the memory 1303 in FIG. 13 in this application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example and not limitation, many forms of RAMs are available, such as a static random access memory (Static RAM, SRAM), a dynamic random access memory (Dynamic RAM, DRAM), a synchronous dynamic random access memory (Synchronous DRAM, SDRAM), double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory for the system and the method described in this specification aims to include but is not limited to these memories and any memory of another appropriate type.

Based on the foregoing embodiments, an embodiment of this application further provides a computer program. When the computer program is run on a computer, the computer is enabled to perform the routing method provided in the foregoing embodiments.

Based on the foregoing embodiments, an embodiment of this application further provides a computer-readable storage medium. The computer-readable storage medium stores a computer program. When the computer program is executed by a computer, the computer is enabled to perform the routing method provided in the foregoing embodiments.

The storage medium may be any usable medium that can be accessed by a computer. By way of example and not limitation, the computer-readable medium may include a RAM, a ROM, an EEPROM, a CD-ROM or another optical disk storage, a magnetic disk storage medium or another magnetic storage device, or any other medium that can be used to carry or store expected program code in a form of an instruction or a data structure and that can be accessed by a computer.

Based on the foregoing embodiments, an embodiment of this application further provides a chip. The chip is configured to read a computer program stored in a memory, to implement the routing method provided in the foregoing embodiments.

Based on the foregoing embodiments, an embodiment of this application provides a chip system. The chip system includes a processor, configured to support a computer apparatus in implementing functions related to communication devices in the foregoing embodiments. In a possible design, the chip system further includes a memory, and the memory is configured to store a program and data that are necessary for the computer apparatus. The chip system may include a chip, or may include a chip and another discrete component.

A person skilled in the art should understand that embodiments of this application may be provided as a method, a system, or a computer program product. Therefore, this application may be in a form of a hardware-only embodiment, a software-only embodiment, or an embodiment combining software and hardware aspects. In addition, this application may be in a form of a computer program product implemented on one or more computer-usable storage media (including but not limited to a magnetic disk memory, a CD-ROM, an optical memory, and the like) including computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art may make various modifications and variations to this application without departing from the protection scope of this application. Thus, this application is intended to cover these modifications and variations, provided that they fall within the scope of the claims of this application and their equivalent technologies.

What is claimed is:

1. A routing method for a first terminal device, and comprising:
   determining that a target node of a first data packet is a network device;
   determining that a next-hop node of the first data packet is a first relay terminal device, wherein there is a sidelink (SL) connection between the first terminal device and the first relay terminal device; and
   sending the first data packet, an identifier of the first terminal device, an identifier of the network device, an identifier of the first relay terminal device, and an identifier of a previous-hop node of the first terminal device to the first relay terminal device,
   wherein the sending the first data packet, an identifier of the first terminal device, an identifier of the network device, an identifier of the first relay terminal device, and an identifier of a previous-hop node of the first terminal device to the first relay terminal device comprises:
   sending a second data packet to the first relay terminal device, wherein the second data packet is obtained by encapsulating the first data packet with a first protocol header, and the first protocol header comprises the identifier of the first terminal device, the identifier of the network device, and the identifier of the first relay terminal device.

2. The method according to claim 1, wherein the determining that a next-hop node of the first data packet is a first relay terminal device comprises:
   determining, based on first information associated with the first data packet, that the next-hop node of the first data packet is the first relay terminal device, wherein the first information comprises at least one of: a data type, a message type, port information, or quality of service (QOS) information.

3. The method according to claim 2, wherein the method further comprises:
   determining a first logical channel based on second information associated with the first data packet, wherein the second information comprises at least one of: the data type, the message type, the port information, the QoS information, or an identifier of a first data radio bearer (DRB); and
   the sending the first data packet, an identifier of the first terminal device, an identifier of the network device, and an identifier of the first relay terminal device to the first relay terminal device comprises:
   sending the first data packet, the identifier of the first terminal device, the identifier of the network device, and the identifier of the first relay terminal device to the first relay terminal device through the first logical channel.

4. The method according to claim 1, wherein
   the first protocol header further comprises the identifier of a previous-hop node of the first terminal device, the identifier of the previous-hop node of the first terminal device is for determining first downlink routing table information, and the first downlink routing table information indicates a downlink route of the first terminal device.

5. The method according to claim 1, wherein
the first data packet comprises an identifier of the previous-hop node of the first terminal device, the identifier of the previous-hop node of the first terminal device is for determining first downlink routing table information, and the first downlink routing table information indicates a downlink route of the first terminal device.

6. The method according to claim 1, wherein the method further comprises:
receiving a first message, wherein the first message comprises the identifier of the network device.

7. The method according to claim 1, wherein the method further comprises:
generating the first data packet.

8. A routing method for a first relay terminal device, and comprising:
receiving a first data packet, an identifier of a first terminal device, an identifier of a network device, and an identifier of the first relay terminal device from the first terminal device, wherein the first terminal device is a source node of the first data packet, and the network device is a target node of the first data packet;
determining that a next-hop node of the first data packet is a second relay terminal device, wherein there is a sidelink (SL) connection between the first relay terminal device and the second relay terminal device; and
sending the first data packet, the identifier of the first terminal device, the identifier of the network device, the identifier of the first relay terminal device, an identifier of the second relay terminal device to the second relay terminal device, and an identifier of a previous-hop node of the first terminal device,
wherein the sending a first data packet, an identifier of a first terminal device, an identifier of a network device, and an identifier of the first relay terminal device, and an identifier of a previous-hop node of the first terminal device to the second relay terminal device comprises:
receiving a second data packet from the first terminal device; and
decapsulating the second data packet to obtain the first data packet and a first protocol header, wherein the first protocol header comprises the identifier of the first terminal device, the identifier of the network device, and the identifier of the first relay terminal device.

9. The method according to claim 8, wherein the sending the first data packet, the identifier of the first terminal device, the identifier of the network device, the identifier of the first relay terminal device, and an identifier of the second relay terminal device to the second relay terminal device comprises:
sending a third data packet to the second relay terminal device, wherein the third data packet is obtained by encapsulating the first data packet with a second protocol header, wherein the second protocol header comprises the identifier of the first terminal device, the identifier of the network device, the identifier of the first relay terminal device, and the identifier of the second relay terminal device.

10. The method according to claim 9, wherein
the second protocol header further comprises an identifier of the previous-hop node of the first terminal device, the identifier of the previous-hop node of the first terminal device is for determining first downlink routing table information, and the first downlink routing table information indicates a downlink route of the first terminal device.

11. The method according to claim 8, wherein the determining that a next-hop node of the first data packet is a second relay terminal device comprises:
determining, based on third information associated with the first data packet, that the next-hop node of the first data packet is the second relay terminal device, wherein the third information comprises at least one of: an identifier of the source node, an identifier of the target node, an identifier of a previous-hop node, a data type, a message type, an identifier of a first data radio bearer (DRB), or quality of service (QOS) information.

12. The method according to claim 8, wherein the method further comprises:
determining a second logical channel based on fourth information associated with the first data packet, wherein the fourth information comprises at least one of: the identifier of the source node, the identifier of the target node, the identifier of the previous-hop node, an identifier of the next-hop node, the identifier of the first DRB, or the QoS information; and
the sending the first data packet, the identifier of the first terminal device, an identifier of the second relay terminal device, and the identifier of the network device to the second relay terminal device comprises:
sending the first data packet, the identifier of the first terminal device, the identifier of the second relay terminal device, and the identifier of the network device to the second relay terminal device through the second logical channel.

13. The method according to claim 8, wherein
the first data packet comprises an identifier of the previous-hop node of the first terminal device, the identifier of the previous-hop node of the first terminal device is for determining first downlink routing table information, and the first downlink routing table information indicates a downlink route of the first terminal device.

14. A routing method for a second relay terminal device, and comprising:
receiving a first data packet, an identifier of a first terminal device, an identifier of a network device, an identifier of a first relay terminal device, and an identifier of the second relay terminal device, and an identifier of a previous-bop node of the first terminal device, from the first relay terminal device, wherein the first terminal device is a source node of the first data packet, and the network device is a target node of the first data packet;
determining that a next-hop node of the first data packet is the network device, wherein there is a radio resource control RRC connection between the second relay terminal device and the network device; and
sending the first data packet and the identifier of the first terminal device to the network device,
wherein the receiving a first data packet, an identifier of a first terminal device, an identifier of a network device, an identifier of a first relay terminal device, an identifier of the second relay terminal device, and an identifier of a previous-hop node of the fir al device from the first relay terminal device comprises:
receiving a third data packet from the first relay terminal device; and
decapsulating the third data packet to obtain the first data packet and a second protocol header, wherein the second protocol header comprises the identifier of the first terminal device, the identifier of the network device, the identifier of the first relay terminal device, and the identifier of the second relay terminal device.

15. The method according to claim 14, wherein the sending the first data packet and the identifier of the first terminal device to the network device comprises:

sending a fourth data packet to the network device, wherein the fourth data packet is obtained by encapsulating the first data packet with a third protocol header, and the third protocol header comprises the identifier of the first terminal device.

16. The method according to claim 14, wherein the method further comprises:

determining a third logical channel based on fourth information associated with the first data packet, wherein the fourth information comprises at least one of the following information: an identifier of the source node, an identifier of the target node, an identifier of a previous-hop node, an identifier of the next-hop node, an identifier of a first data radio bearer (DRB), or quality of service (QOS) information; and the sending the first data packet and the identifier of the first terminal device to the network device comprises:

sending the first data packet and the identifier of the first terminal device to the network device through the third logical channel.

17. The method according to claim 15, wherein the third protocol header further comprises an identifier of the previous hop of the first terminal device, the identifier of the previous-hop node of the first terminal device is for determining first downlink routing table information, and the first downlink routing table information indicates a downlink route of the first terminal device.

* * * * *